United States Patent
Han et al.

(10) Patent No.: US 9,154,270 B2
(45) Date of Patent: Oct. 6, 2015

(54) METHOD AND APPARATUS FOR PERFORMING HARQ IN A WIRELESS COMMUNICATION SYSTEM

(71) Applicant: LG ELECTRONICS INC., Seoul (KR)

(72) Inventors: Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/684,027

(22) Filed: Apr. 10, 2015

(65) Prior Publication Data

US 2015/0215083 A1    Jul. 30, 2015

Related U.S. Application Data

(63) Continuation of application No. 14/508,674, filed on Oct. 7, 2014, now Pat. No. 9,042,335, which is a continuation of application No. 13/510,276, filed as application No. PCT/KR2010/007704 on Nov. 3, 2010, now Pat. No. 8,885,588.

(60) Provisional application No. 61/262,156, filed on Nov. 18, 2009.

(30) Foreign Application Priority Data

Aug. 16, 2010    (KR) .................. 10-2010-0078901

(51) Int. Cl.
H04W 4/00      (2009.01)
H04L 1/18      (2006.01)
H04L 5/00      (2006.01)

(52) U.S. Cl.
CPC ............ *H04L 1/1893* (2013.01); *H04L 1/1812* (2013.01); *H04L 5/0023* (2013.01); *H04L 5/0026* (2013.01); *H04L 5/0051* (2013.01); *H04L 5/0055* (2013.01)

(58) Field of Classification Search
None
See application file for complete search history.

(56) References Cited

U.S. PATENT DOCUMENTS

2009/0201863 A1    8/2009    Pi
2009/0268685 A1    10/2009   Chen et al.
(Continued)

FOREIGN PATENT DOCUMENTS

JP    2013-510498    3/2013
JP    5529973        6/2014
(Continued)

OTHER PUBLICATIONS

3GPP, "Technical Specification Group Radio Access Network; Evolved Universal Terrestrial Radio Access (E-UTRA); Physical Channels and Modulation (Release 8)", 3GPP TS 36.211 V8.8.0, Sep. 2009, 83 pages.
(Continued)

*Primary Examiner* — Otis L Thompson, Jr.
(74) *Attorney, Agent, or Firm* — Lee, Hong, Degerman, Kang & Waimey

(57) ABSTRACT

The present invention provides a method and apparatus for performing hybrid automatic repeat request (HARQ) in a wireless communication system. A terminal transmits a plurality of code words on a physical uplink shared channel (PUSCH) and receives a plurality of acknowledgement/non-acknowledgement (ACK/NACK) signals, which indicates if each of the plurality of code words has been received, on each physical hybrid-ARQ indicator channel (PHICH) corresponding to the respective code words. A downlink resource for which each of the PHICHs is mapped is determined based on the smallest physical resource block (PRB) index ($I_{PRB\_RA}^{lowest\_index}$) among PRBs mapped by the PUSCH and on an uplink demodulation reference signal (DMRS) circular shift parameter ($n_{DMRS}$), and those downlink resources for which PHICHs are mapped respectively do not overlap each other.

12 Claims, 30 Drawing Sheets

(56) References Cited

U.S. PATENT DOCUMENTS

| | | | |
|---|---|---|---|
| 2010/0172308 | A1 | 7/2010 | Nam et al. |
| 2010/0173625 | A1 | 7/2010 | Noh et al. |
| 2010/0284360 | A1 | 11/2010 | Dalsgaard et al. |
| 2011/0170499 | A1 | 7/2011 | Nayeb Nazar et al. |
| 2012/0076078 | A1 | 3/2012 | Han et al. |
| 2012/0120882 | A1* | 5/2012 | Luo et al. ............... 370/329 |
| 2012/0120908 | A1 | 5/2012 | Ahn et al. |
| 2012/0140724 | A1 | 6/2012 | Sipola et al. |
| 2012/0275409 | A1 | 11/2012 | Han et al. |
| 2013/0028216 | A1 | 1/2013 | Baldemair et al. |
| 2014/0105191 | A1* | 4/2014 | Yang et al. ............... 370/336 |
| 2015/0055597 | A1 | 2/2015 | Han et al. |

FOREIGN PATENT DOCUMENTS

| | | |
|---|---|---|
| WO | 2009/087597 | 7/2009 |
| WO | 2009/099306 | 8/2009 |
| WO | 2009/134926 | 11/2009 |
| WO | 2011/062383 | 5/2011 |

OTHER PUBLICATIONS

IP Australia Application Serial No. 2010322640, Notice of Allowance dated Feb. 17, 2014, 3 pages.
3rd Generation Partnership Project, "Technical Specification Group Radio Access Network; Evolved Universal Terrestrial Radio Access (E-UTRA); Physical layer procedures (Release 8)", 3GPP TS 36.213 V8.8.0, Sep. 2009, 77 pages.
State Intellectual Property Office of the People's Republic of China Application Serial No. 201080052359.3, Office Action dated May 29, 2014, 9 pages.
3rd Generation Partnership Project (3GPP), "Technical Specification Group Radio Access Network; Evolved Universal Terrestrial Radio Access (E-UTRA); Physical layer procedures (Release 8)," 3GPP TS 36.213 V8.8.0, Sep. 2009, 77 pages.
Canadian Intellectual Property Office Application Serial No. 2,780,390, Office Action dated Aug. 20, 2014, 3 pages.
"3rd Generation Partnership Project; Technical Specification Group Radio Access Network; Evolved Universal Terrestrial Radio Access (E-UTRA); Physical Channels and Modulation (Release 8)", 3GPP TS 36.211 V8.8.0, Sep. 2009.
"3rd Generation Partnership Project; Technical Specification Group Radio Access Network; Evolved Universal Terrestrial Radio Access (E-UTRA); Physical layer procedures (Release 8)", 3GPP TS 36.213 V8.8.0, Sep. 2009.
CATT, "PHICH for LTE-A", R1-094674, 3GPP TSG RAN WG1 meeting #59, Nov. 2009.
Motorola, "PHICH for Carrier Aggregation," 3GPP TSG RAN1 #58-Bis, R1-093985, Oct. 2009, 2 pages.
Samsung, "PHICH Mapping in Asymmetric Carrier Aggregation," 3GPP TSG RAN WG1 Meeting #58bis, R1-094080, Oct. 2009, 3 pages.
Japan Patent Office Application Serial No. 2012-537812, Office Action dated Oct. 21, 2013, 3 pages.
Samsung, "PHICH Mapping in Asymmetric Carrier Aggregation," 3GPP TSG RAN WG1 Meeting #55b, R1-090098, Jan. 2009, 3 pages.
CATT, "PHICH for LTE-A," 3GPP TSG RAN WG1 meeting #59, R1-094674, Nov. 2009, 3 pages.
Ericsson, et al., "PHICH for Carrier Aggregation," 3GPP TSG-RAN WG1 #58bis, R1-094272, Oct. 2009, 3 pages.
Japan Patent Office Application Serial No. 2014-085129, Office Action dated Dec. 10, 2014, 4 pages.
Japan Patent Office Application Serial No. 2014-085129, Office Action dated Jul. 7, 2015, 3 pages.

* cited by examiner

FIG. 12
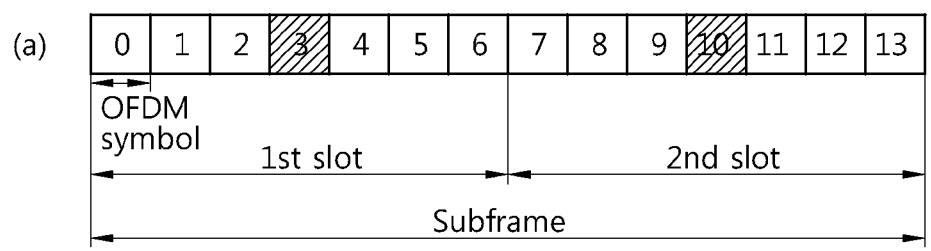
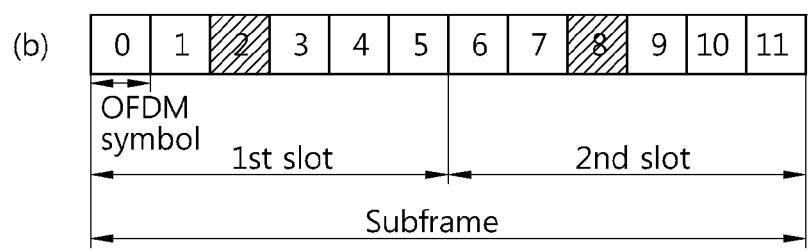

FIG. 25
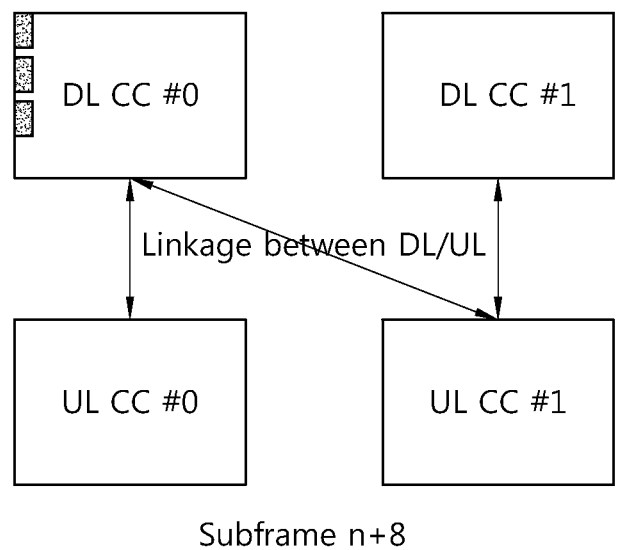
Subframe n+8
 Collision for two PHICHs because for same scheduled position of PUSCHs

METHOD AND APPARATUS FOR PERFORMING HARQ IN A WIRELESS COMMUNICATION SYSTEM

CROSS-REFERENCE TO RELATED APPLICATIONS

This application is a continuation of U.S. patent application Ser. No. 14/508,674, filed on Oct. 7, 2014, now U.S. Pat. No. 9,042,335, which is a continuation of U.S. patent application Ser. No. 13/510,276, filed on Jul. 20, 2012, now U.S. Pat. No. 8,885,588, which is the National Stage filing under 35 U.S.C. 371 of International Application No. PCT/KR2010/007704, filed on Nov. 3, 2010, which claims the benefit of earlier filing date and right of priority to Korean Application No. 10-2010-0078901, filed on Aug. 16, 2010 and also claims the benefit of U.S. Provisional Application No. 61/262,156, filed on Nov. 18, 2009, the contents of which are all incorporated by reference herein in their entirety.

BACKGROUND OF THE INVENTION

1. Field of the Invention

The present invention relates to wireless communications, and more particularly, to a method and apparatus for performing uplink hybrid automatic repeat request (HARQ) in a wireless communication system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

As disclosed in the section 6 of 3GPP (3rd generation partnership project) TS 36.211 V8.8.0 (2009-09) "Technical Specification Group Radio Access Network; Evolved Universal Terrestrial Radio Access (E-UTRA); Physical channels and modulation (Release 8)", examples of downlink control channels used in 3GPP LTE include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. The control information transmitted through the PDCCH is called downlink control information (DCI). The DCI indicates uplink or downlink scheduling information and an uplink transmit power control command for any user equipment (UE) groups. The PHICH carries an acknowledgement (ACK)/non-acknowledgement (NACK) signal for uplink hybrid automatic repeat request (HARQ). That is, the ACK/NACK signal for uplink data transmitted by the UE is transmitted through the PHICH.

A plurality of PHICHs can be allocated according to a system environment. In particular, the plurality of PHICHs need to be allocated simultaneously in a carrier aggregation system for transmitting data by using a plurality of carriers, a MIMO system, etc. A base station (BS) allocates resources to the plurality of PHICHs, and transmits ACK/NACK through the PHICH.

There is a need for a resource allocation method for avoiding collision of resources allocated when a plurality of PHICHs are transmitted.

SUMMARY OF THE INVENTION

The present invention provides a method and apparatus for performing uplink hybrid automatic repeat request (HARQ) in a wireless communication system.

In an aspect, a method of performing hybrid automatic repeat request (HARQ) in a wireless communication system is provided. The method includes transmitting a plurality of codewords through a physical uplink shared channel (PUSCH), and receiving a plurality of acknowledgement/non-acknowledgement (ACK/NACK) signals, which respectively indicate whether the plurality of codewords are received, through respective physical hybrid-ARQ indicator channels (PHICH) corresponding to the respective codewords, wherein a downlink resource to which each of the PHICHs is mapped is determined based on an index $I_{PRB\_RA}^{lowest\_index}$ of a lowest physical resource block (PRB) among PRBs to which the PUSCH is mapped and based on an uplink demodulation reference signal (DMRS) cyclic shift parameter $n_{DMRS}$, and wherein downlink resources to which the respective PHICHs are mapped do not overlap with each other. The number of the plurality of codewords may be 2. Downlink resources to which the respective PHICHs are mapped may be determined based on an offset $\beta$, and specifically, may be determined based on the equation $$n_{PHICH}^{group} = ((I_{PRB\_RA}^{lowest\_index} + \beta) + n_{DMRS}) \bmod N_{PHICH}^{group} + I_{PHICH} N_{PHICH}^{group}$$

-continued $$n_{PHICH}^{seq} = ([(I_{PRB\_RA}^{lowest\_index} + \beta)/N_{PHICH}^{group}] + n_{DMRS}) \bmod 2N_{SF}^{PHICH},$$

, where $n_{PHICH}^{group}$ is an index of a PHICH group, $n_{PHICH}^{seq}$ is an orthogonal sequence index in the PHICH group, β is the offset, $N_{PHICH}^{group}$ is the number of the PHICH groups, $I_{PHICH}$ is a value 0 or 1, and $N_{SF}^{PHICH}$ is a spreading factor (SF). The offset β may be either 0 or 1. The offset β may be predetermined or is signaled by a higher layer. The transmitting of the plurality of codewords includes mapping the plurality of codewords to modulation symbols by scrambling the codewords, mapping the modulation symbols to respective layers, precoding the respective layers by performing discrete Fourier transform (DFT) spreading on the layers, and transmitting a stream generated by the precoding by mapping the stream to a resource element. The plurality of codewords and the plurality of ACK/NACK signals may be transmitted through a plurality of carriers. A carrier in which each of the codewords is transmitted may be the same carrier as a carrier in which each of the ACK/NACK signals is transmitted. The plurality of carriers may be managed by at least one media access control (MAC). The plurality of ACK/NACK signals may be transmitted through a plurality of antennas.

In another aspect, an apparatus for performing hybrid automatic repeat request (HARQ) in a wireless communication system is provided. The apparatus includes a radio frequency (RF) unit transmitting a plurality of codewords through a physical uplink shared channel (PUSCH), and receiving a plurality of acknowledgement/non-acknowledgement (ACK/NACK) signals, which respectively indicate whether the plurality of codewords are received, through respective physical hybrid-ARQ indicator channels (PHICH) corresponding to the respective codewords, and a processor coupled to the RF unit and processing the plurality of codewords and the plurality of ACK/NACK signals, wherein a downlink resource to which each of the PHICHs is mapped is determined based on an index $I_{PRB\_RA}^{lowest\_index}$ of a lowest physical resource block (PRB) among PRBs to which the PUSCH is mapped and based on an uplink demodulation reference signal (DMRS) cyclic shift parameter $n_{DMRS}$, and wherein downlink resources to which the respective PHICHs are mapped do not overlap with each other.

In another aspect, a method of transmitting an acknowledgement/non-acknowledgement (ACK/NACK) signal in a wireless communication system is provided. The method includes generating a plurality of physical hybrid-ARQ indicator channel (PHICH) sequences, mapping the generated plurality of PHICH sequences to a downlink resource, and transmitting the mapped plurality of PHICH sequences to a user equipment, wherein a downlink resource to which each of the PHICHs is mapped is determined based on an index $I_{PRB\_RA}^{lowest\_index}$ of a lowest physical resource block (PRB) among PRBs to which a physical uplink shared channel (PUSCH) corresponding to each of the PHICHs is mapped and based on an uplink demodulation reference signal (DMRS) cyclic shift parameter $n_{DMRS}$, and wherein downlink resources to which the respective PHICHs are mapped do not overlap with each other.

Hybrid automatic repeat request (HARQ) can be effectively performed by avoiding collision of resources to which a plurality of physical hybrid-ARQ indicator channels (PHICHs) are mapped.

BRIEF DESCRIPTION OF THE DRAWINGS

FIG. 12 shows examples of a subframe through which a reference signal is transmitted.
FIGS. 23 to 25 show examples of a case where PHICH resources collide with each other when a plurality of PHICHs is allocated.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
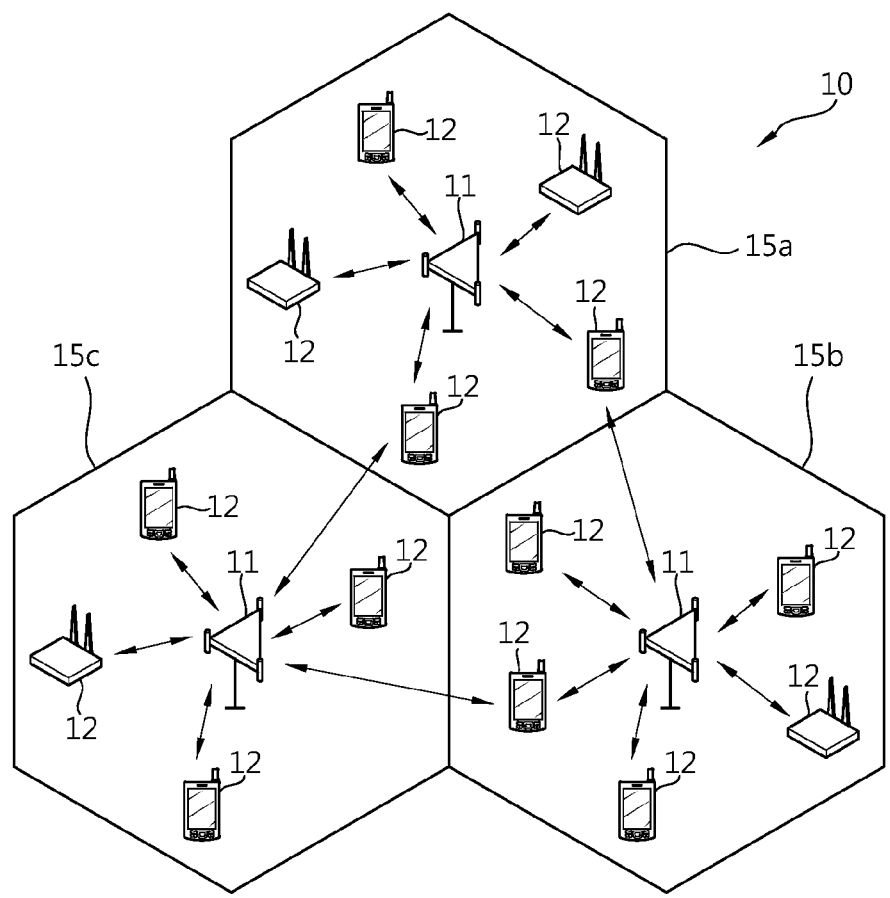
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas.

Hereinafter, a transmission antenna refers to a physical or logical antenna used for transmitting a signal or a stream, and a reception antenna refers to a physical or logical antenna used for receiving a signal or a stream.

Figure 2:
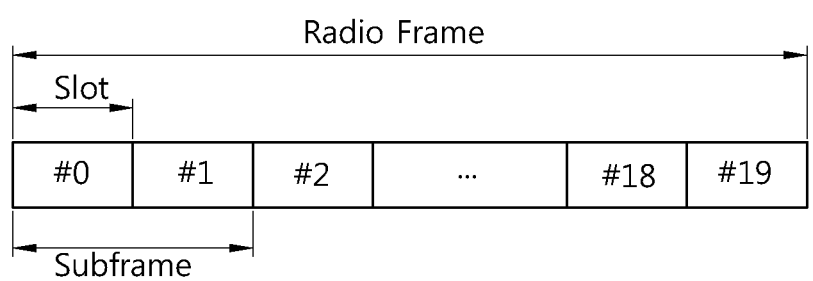
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
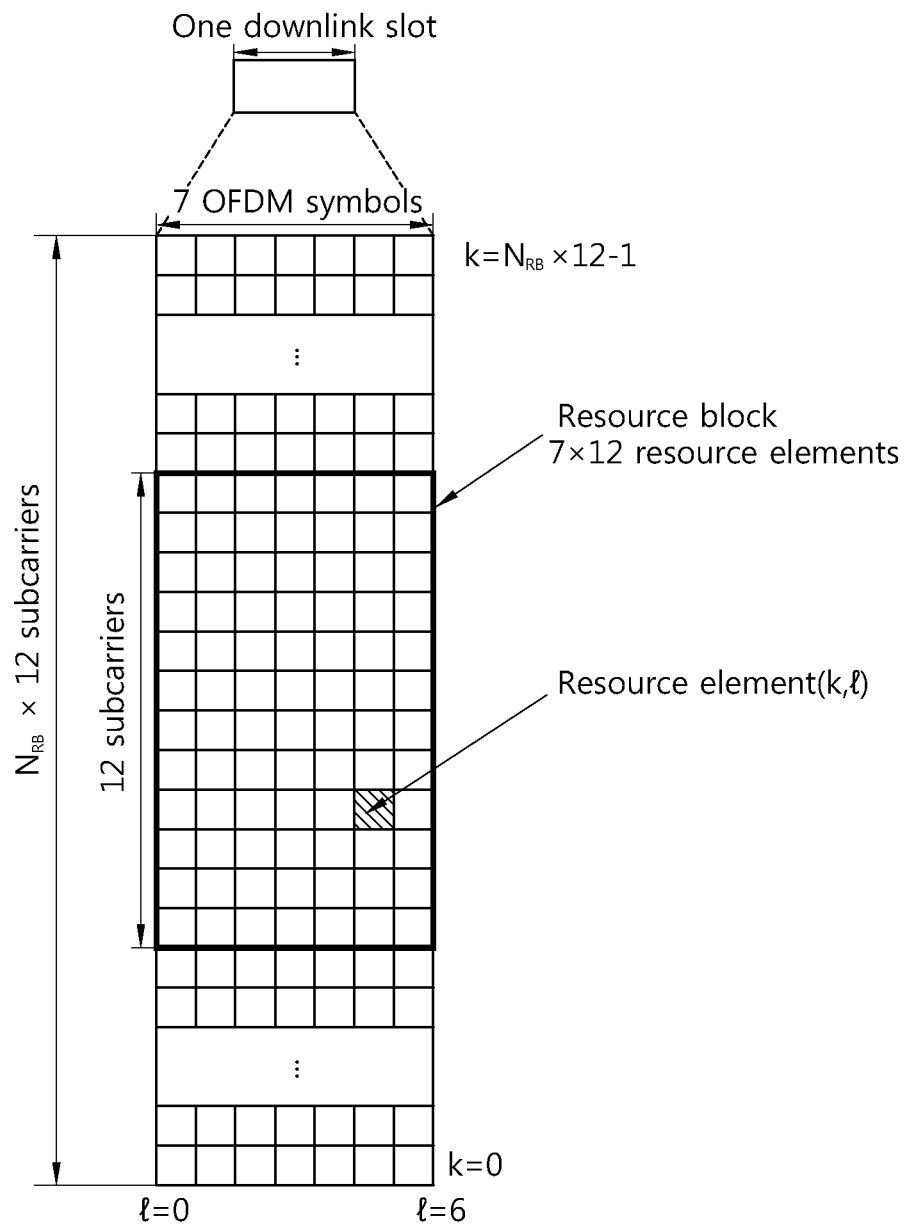
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
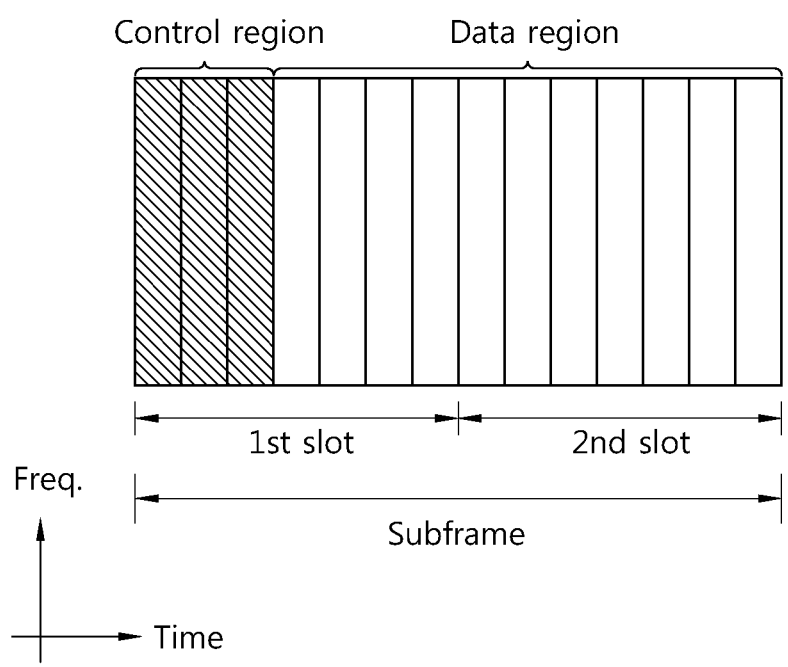
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
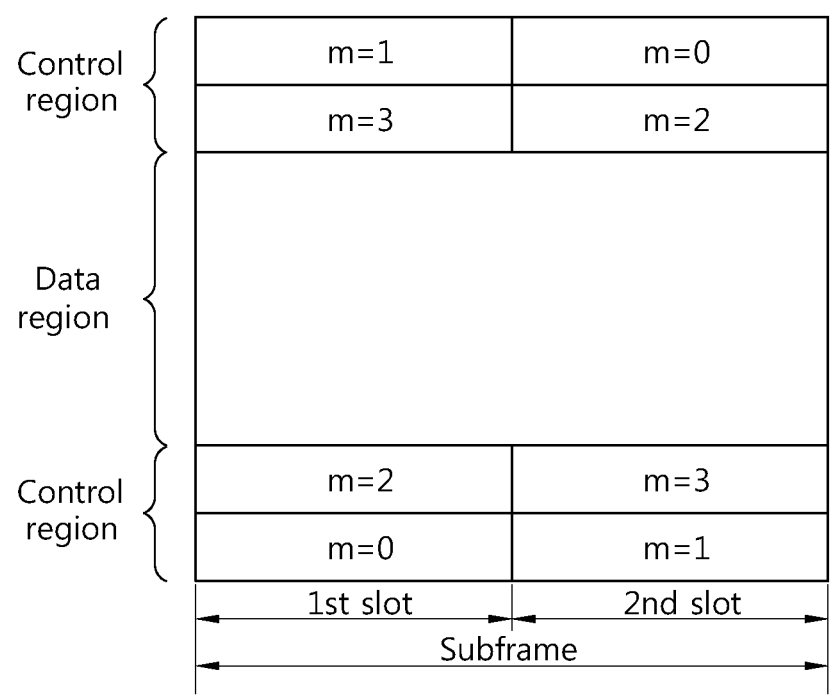
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. The user equipment does not transmit the PUCCH and the PUSCH simultaneously to maintain a single carrier property.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 6:
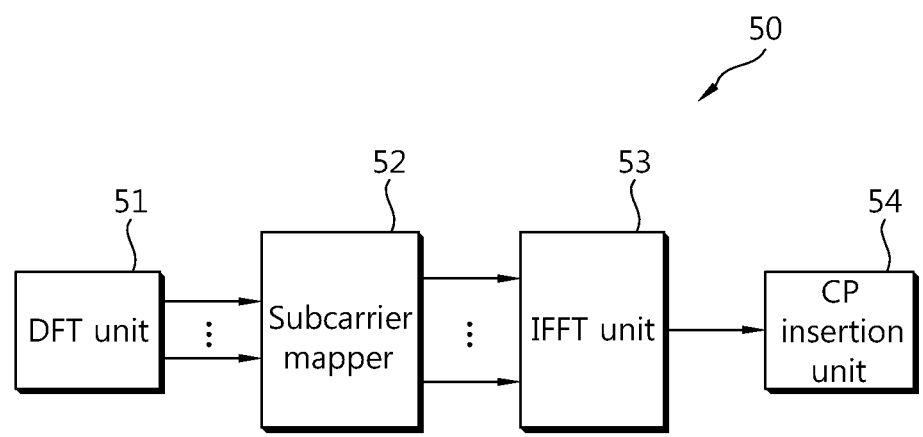
FIG. 6 shows an example of the structure of a transmitter in an SC-FDMA system.

FIG. 6 shows an example of the structure of a transmitter in an SC-FDMA system.

Referring to FIG. 6, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 7:
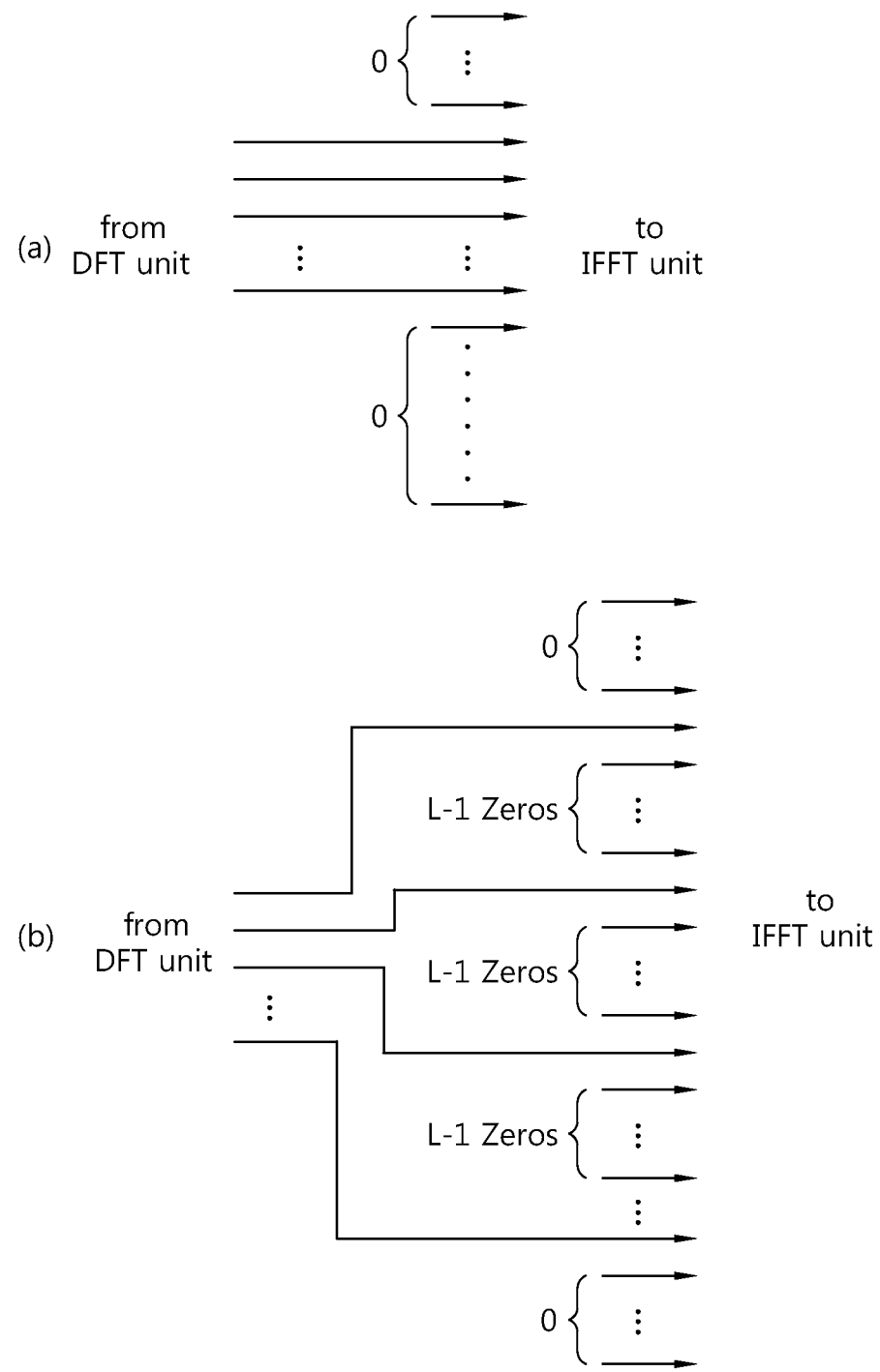
FIG. 7 shows an example of a scheme in which the subcarrier mapper maps the complex-valued symbols to the respective subcarriers of the frequency domain.

FIG. 7 shows an example of a scheme in which the subcarrier mapper maps the complex-valued symbols to the respective subcarriers of the frequency domain.

Referring to FIG. 7(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 7(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 7(a) or the distributed mapping scheme as in FIG. 10(b), a single carrier characteristic is maintained.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 8:
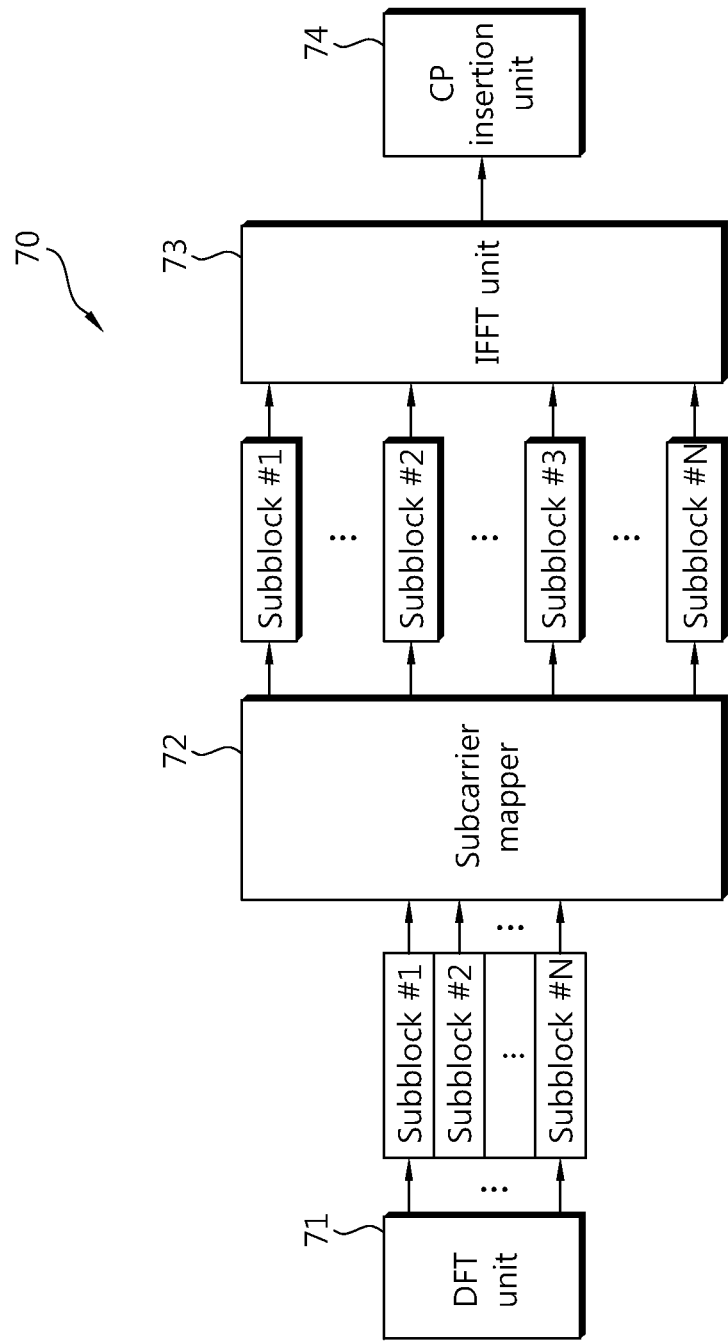
FIGS. 8 to 10 show an example of a transmitter using the clustered DFT-s OFDM transmission scheme.

FIG. 8 shows an example of a transmitter using the clustered DFT-s OFDM transmission scheme.

Referring to FIG. 8, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, ..., a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 8 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 8, a time domain signal is generated through one IFFT unit 73. Accordingly, in order for the transmitter 70 of FIG. 8 to be used in a multi-carrier transmitter, subcarrier intervals between contiguous carriers in a contiguous carrier allocation situation must be aligned.

Figure 9:
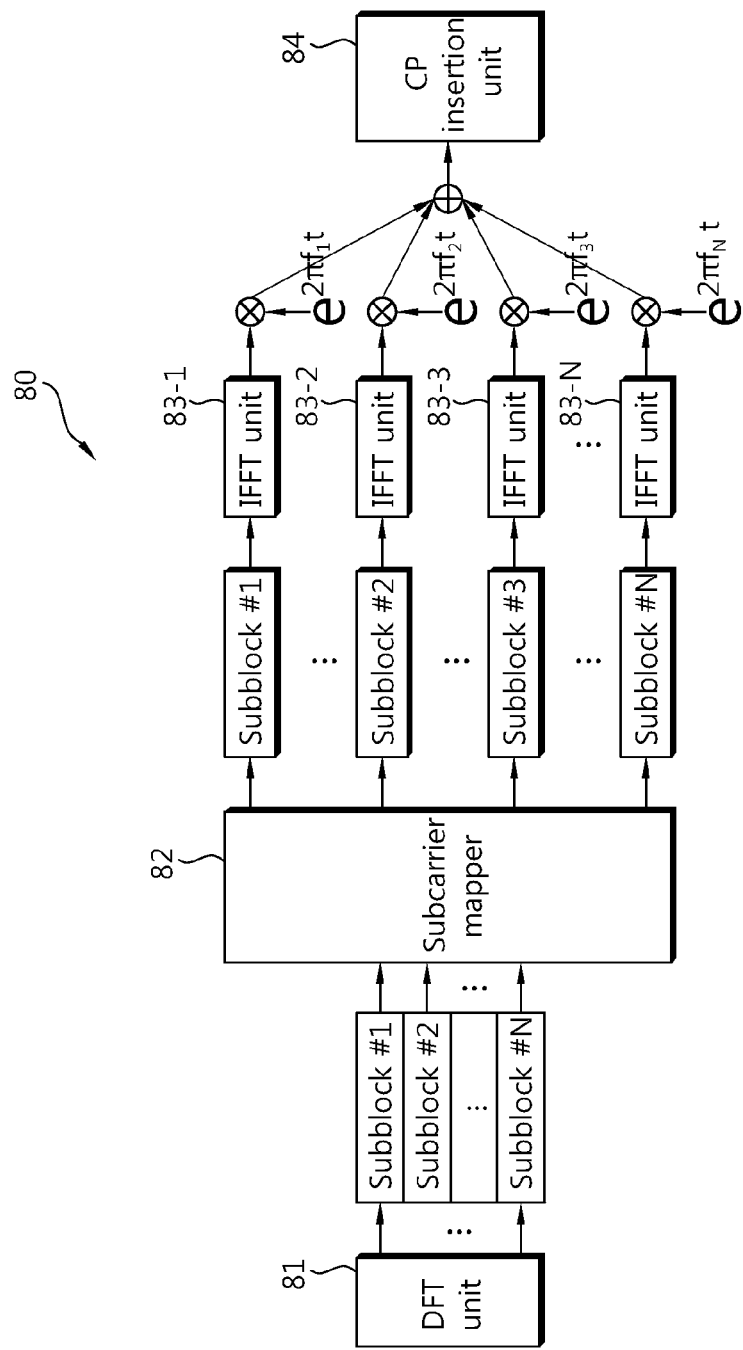

FIG. 9 shows another example of a transmitter using the clustered DFT-s OFDM transmission scheme.

Referring to FIG. 9, the transmitter 80 includes a DFT unit 81, a subcarrier mapper 82, a plurality of IFFT units 83-1, 83-2, ..., 83-N(N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-$n$ outputs an nth baseband signal (n=1, 2, ..., N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 9 may be used in a discontinuous carrier allocation situation where carriers allocated to the transmitter are not contiguous to each other.

Figure 10:
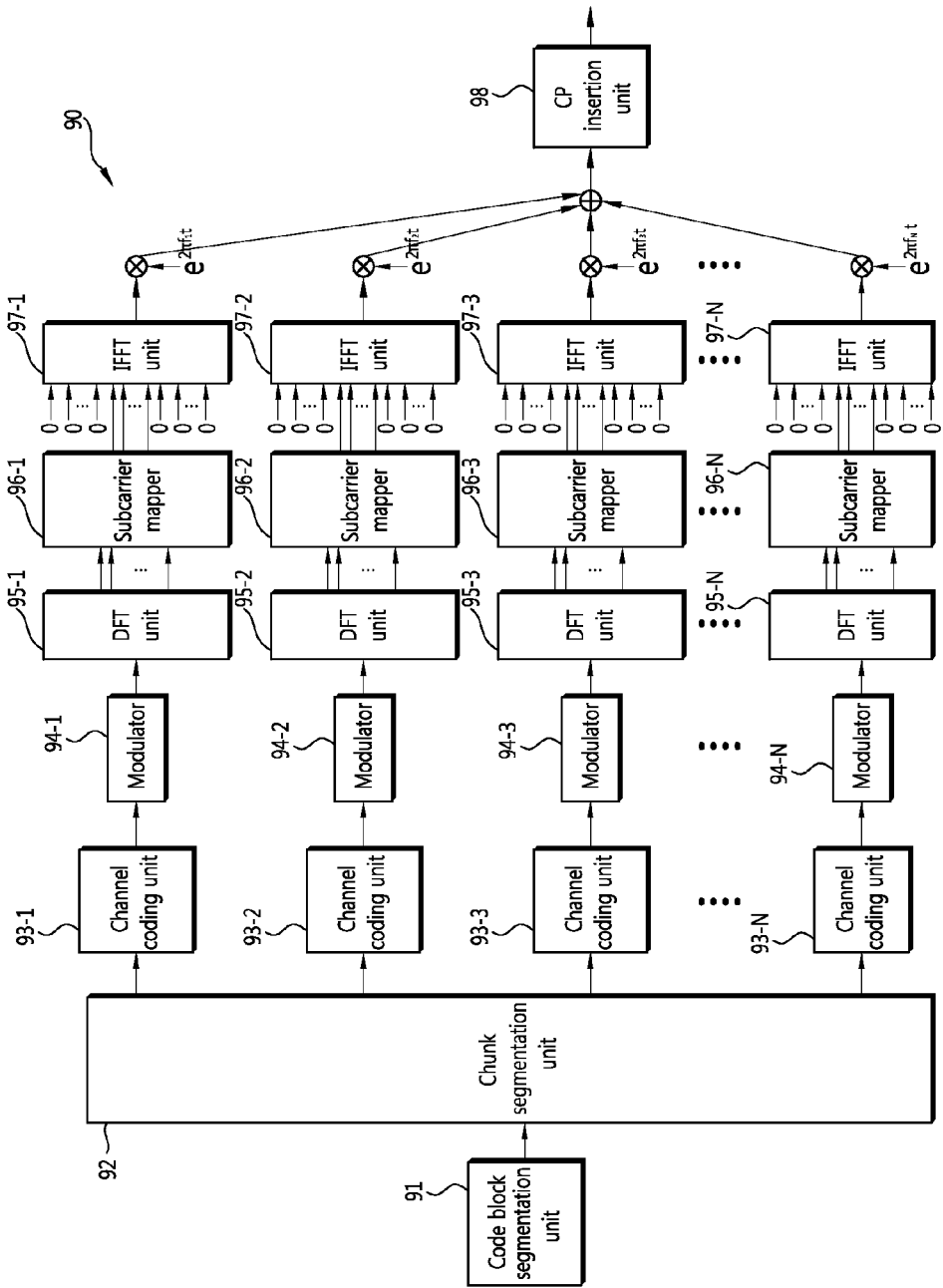

FIG. 10 is another example of a transmitter using the clustered DFT-s OFDM transmission scheme.

FIG. 10 is a chunk-specific DFT-s OFDM system performing DFT precoding on a chunk basis. This may be called Nx SC-FDMA. Referring to FIG. 10, the transmitter 90 includes a code block division unit 91, a chunk division unit 92, a plurality of channel coding units 93-1, ..., 93-N, a plurality of modulators 94-1, ..., 94-N, a plurality of DFT units 95-1, ..., 95-N, a plurality of subcarrier mappers 96-1, ..., 96-N, a plurality of IFFT units 97-1, ..., 97-N, and a CP insertion unit 98. Here, N may be the number of multiple carriers used by a multi-carrier transmitter. Each of the channel coding units 93-1, ..., 93-N may include a scramble unit (not shown). The modulators 94-1, ..., 94-N may also be called modulation mappers. The transmitter 90 may further include a layer mapper (not shown) and a layer permutator (not shown) which may be placed in front of the DFT units 95-1, ..., 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be precoded and may be an antenna-specific reference signal.

A reference signal sequence $r_{u,v}^{(\alpha)}(n)$ may be defined based on a basic sequence $b_{u,v}(n)$ and a cyclic shift a according to Equation 1.

$$r_{u,v}^{(\alpha)} = e^{j\alpha n} b_{u,v}(n), 0 \leq n < M_{sc}^{RS} \qquad \text{<Equation 1>}$$

In Equation 1, $M_{sc}^{RS}(1 \leq m \leq N_{RB}^{max,UL})$ is the length of the reference signal sequence and $M_{sc}^{RS} = m*N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value α from one basic sequence.

A basic sequence $b_{u,v}(n)$ is divided into a plurality of groups. Here, $u \in \{0, 1, \ldots, 29\}$ indicates a group index, and v indicates a basic sequence index within the group. The basic sequence depends on the length $M_{sc}^{RS}$ of the basic sequence. Each group includes a basic sequence (v=0) having a length of $M_{sc}^{RS}$ for m ($1 \leq m \leq 5$) and includes 2 basic sequences (v=0,1) having a length of $M_{sc}^{RS}$ for m ($6 \leq m \leq n_{RB}^{max,UL}$). The sequence group index u and the basic sequence index v within a group may vary according to time as in group hopping or sequence hopping.

Furthermore, if the length of the reference signal sequence is $3N_{sc}^{RB}$ or higher, the basic sequence may be defined by Equation 2.

$$b_{u,v}(n) = x_q(n \bmod N_{ZC}^{RS}), 0 \leq n < M_{sc}^{RS} \qquad \text{<Equation 2>}$$

In Equation 2, q indicates a root index of a Zadoff-Chu (ZC) sequence. $N_{ZC}^{RS}$ is the length of the ZC sequence and may be a maximum prime number smaller than $M_{sc}^{RS}$. The ZC sequence having the root index q may be defined by Equation 3.

<Equation 3>

$$x_q(m) = e^{-j\frac{\pi qm(m+1)}{N_{ZC}^{RS}}}, 0 \leq m \leq N_{ZC}^{RS} - 1$$

q may be given by Equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \qquad \text{<Equation 4>}$$

If the length of the reference signal sequence is $3N_{sc}^{RB}$ or less, the basic sequence may be defined by Equation 5.

$$b_{u,v}(n) = e^{j\phi(n)\pi/4}, 0 \leq n \leq M_{sc}^{RS} - 1 \qquad \text{<Equation 5>}$$

Table 1 is an example where $\phi(n)$ is defined when $M_{sc}^{RS} = N_{sc}^{RB}$.

TABLE 1

| | $\phi(0), \ldots, \phi(11)$ | | | | | | | | | | |
|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 3 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Table 2 is an example where $\phi(n)$ is defined when $M_{sc}^{RS} = 2 \cdot N_{sc}^{RB}$.

TABLE 2

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -3 | -3 | -3 | 3 | 3 | -3 | 3 | 3 | -1 | -3 | 3 | -1 | 1 | -3 | 1 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of a reference signal may be applied as follows.

The sequence group index u of a slot index $n_s$ may be defined based on a group hopping pattern $f_{gh}(n_s)$ and a sequence shift pattern $f_{ss}$ according to Equation 6.

$$u=(f_{gh}(n_s)+f_{ss}) \bmod 30 \quad \text{<Equation 6>}$$

17 different group hopping patterns and 30 different sequence shift patterns may exist. Whether to apply group hopping may be indicated by a higher layer.

A PUCCH and a PUSCH may have the same group hopping pattern. A group hopping pattern $f_{gh}(n_s)$ may be defined by Equation 7.

<Equation 7>

$$f_{gh}(n_s) = \begin{cases} 0 & \text{if group hopping is disabled} \\ \left(\sum_{i=0}^{7} c(8n_s+i) \cdot 2^i\right) \bmod 30 & \text{if group hopping is enabled} \end{cases}$$

In Equation 7, c(i) is a pseudo random sequence that is a PN sequence and may be defined by a Gold sequence of a length-31. Equation 8 shows an example of a gold sequence c(n).

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_1(n)) \bmod 2 \quad \text{<Equation 8>}$$

Here, Nc=1600, $x_1(i)$ is a first m-sequence, and $x_2(i)$ is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be $f_{ss}^{PUCCH}=N_{ID}^{cell} \bmod 30$. The sequence shift pattern of the PUSCH may be $f_{ss}^{PUSCH}=(f_{ss}^{PUCCH} \pm \Delta_{ss}) \bmod 30$ and $\Delta_{ss} \in \{0, 1, \ldots, 29\}$ may be configured by a higher layer.

Sequence hopping may be applied to only a reference signal sequence having a length longer than $6N_{sc}^{RB}$. Here, a basic sequence index v within a basic sequence group of a slot index $n_s$ may be defined by Equation 9.

$$v = \begin{cases} c(n_s) & \text{if group hopping is disabled} \\ & \text{and sequence hopping is enabled} \\ 0 & \text{otherwise} \end{cases} \quad \text{<Equation 9>}$$

c(i) may be represented by an example of Equation 8. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence for a PUSCH may be defined by Equation 10.

$$r^{PUSCH}(m \cdot M_{sc}^{RS}+n)=r_{u,v}^{(\alpha)}(n) \quad \text{<Equation 10>}$$

In Equation 10, m=0,1, . . . and n=0, . . . , $M_{sc}^{RS}-1$. $M_{sc}^{RS}=M_{sc}^{PUSCH}$.

$\alpha=2\pi n_{cs}/12$, that is, a cyclic shift value is given within a slot, and $n_{cs}$ may be defined by Equation 11.

$$n_{cs}=(n_{DMRS}^{(1)}+n_{DMRS}^{(2)}+n_{PRS}(n_s)) \bmod 12 \quad \text{<Equation 11>}$$

In Equation 11, $n_{DMRS}^{(1)}$ is indicated by a parameter transmitted by a higher layer, and Table 16 shows an example of a corresponding relationship between the parameter and $n_{DMRS}^{(1)}$.

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 11, $n_{DMRS}^{(2)}$ may be defined by a cyclic shift field within a DCI format 0 for a transmission block corresponding to PUSCH transmission. The DCI format is transmitted in a PDCCH. The cyclic shift field may have a length of 3 bits.

Table 4 shows an example of a corresponding relationship between the cyclic shift field and $n_{DMRS}^{(2)}$.

TABLE 4

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

Table 5 is another example of a corresponding relationship between the cyclic shift field and $n_{DMRS}^{(2)}$.

TABLE 5

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

If a PDCCH including the DCI format 0 is not transmitted in the same transmission block, if the first PUSCH is semi-persistently scheduled in the same transmission block, or if the first PUSCH is scheduled by a random access response grant in the same transmission block, $n_{DMRS}^{(2)}$ may be 0.

A cyclic shift field in the DCI format 0 may indicate $n_{DMRS}$ used for determining a resource in which a PHICH is mapped according to Table 6. $n_{DMRS}$ may determine an offset of the resource in which the PHICH is mapped.

TABLE 6

| Cyclic Shift for DMRS Field in DCI format 0 | $n_{DMRS}$ |
| --- | --- |
| 000 | 0 |
| 001 | 1 |
| 010 | 2 |
| 011 | 3 |
| 100 | 4 |
| 101 | 5 |
| 110 | 6 |
| 111 | 7 |

$n_{DMRS}^{(2)}$ shall be set to zero, if there is no PDCCH with DCI format 0 for the same transport block, and if the initial PUSCH for the same transport block is semi-persistently scheduled, or if the initial PUSCH for the same transport block is scheduled by a random access response grant.

Back in Equation 11, $n_{PRS}(n_s)$ may be defined by Equation 12.

$$n_{PRS}(n_s) = \sum_{i=0}^{7} c(8 N_{symb}^{UL} \cdot n_s + i) \cdot 2^i \qquad \text{<Equation 12>}$$

c(i) may be represented by the example of Equation 8 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence $r^{PUSCH}$ is multiplied by an amplitude scaling factor $\beta_{PUSCH}$ and mapped to a physical transmission block, used in relevant PUSCH transmission, from $r^{PUSCH}(0)$ in a sequence starting. The DMRS sequence is mapped to a fourth OFDM symbol (OFDM symbol index 3) in case of a normal CP within one slot and mapped to a third OFDM symbol (OFDM symbol index 2) within one slot in case of an extended CP.

Figure 11:
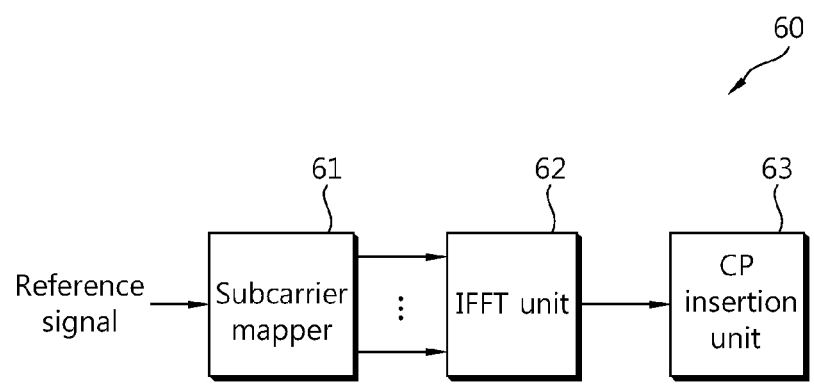
FIG. 11 shows an example of the structure of a reference signal transmitter for demodulation.

FIG. 11 shows an example of the structure of a reference signal transmitter for demodulation.

Referring to FIG. 11 the reference signal transmitter 60 includes a subcarrier mapper 61, an IFFT unit 62, and a CP insertion unit 63. Unlike the transmitter 50 of FIG. 6, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 7(a).

FIG. 12 shows examples of a subframe through which a reference signal is transmitted.

The structure of the subframe in FIG. 12(a) shows a case of a normal CP. The subframe includes a first slot and a second slot. Each of the first slot and the second slot includes 7 OFDM symbols. The 14 OFDM symbols within the subframe are assigned respective symbol indices 0 to 13. A reference signal may be transmitted through the OFDM symbols having the symbol indices 3 and 10. Data may be transmitted through the remaining OFDM symbols other than the OFDM symbols through which the reference signal is transmitted. The structure of a subframe in FIG. 12(b) shows a case of an extended CP. The subframe includes a first slot and a second slot. Each of the first slot and the second slot includes 6 OFDM symbols. The 12 OFDM symbols within the subframe are assigned symbol indices 0 to 11. A reference signal is transmitted through the OFDM symbols having the symbol indices 2 and 8. Data is transmitted through the remaining OFDM symbols other than the OFDM symbols through which the reference signal is transmitted. Even though it is not shown in FIG. 12, a sounding reference signal (SRS) may be transmitted through OFDM symbols in the subframe.

Meanwhile, an orthogonal code cover (OCC) can be applied to a reference signal sequence. The OCC implies a code having orthogonality and applicable to a sequence. In general, a reference signal sequence having a different cyclic shift value can be used to multiplex a reference signal between layers or users. However, the OCC can be applied to increase a multiplexing level and to decrease interference between the layers or the users.

Figure 13:
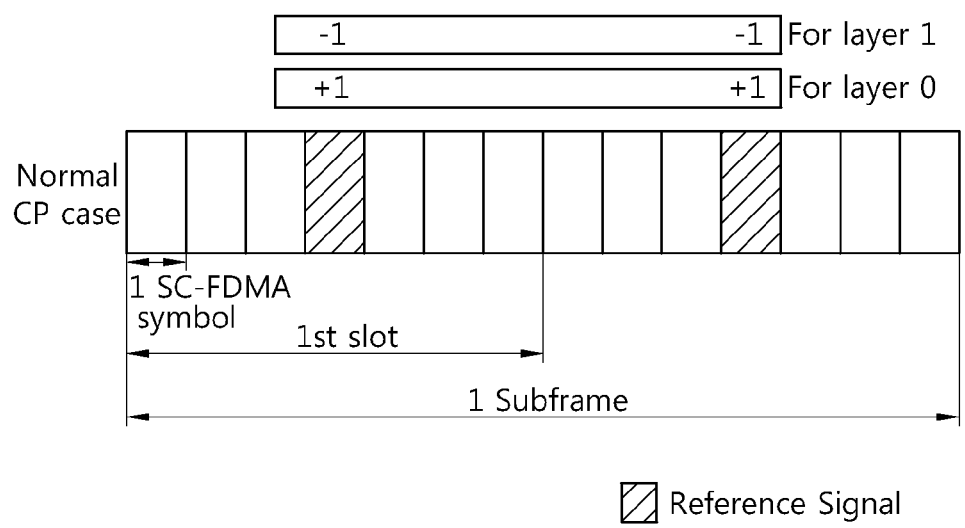
FIG. 13 shows an example in which an OCC is applied to a reference signal.

FIG. 13 shows an example in which an OCC is applied to a reference signal.

In one subframe, both of a reference signal sequence for a layer 0 and a reference signal sequence for a layer 1 are mapped to a $4^{th}$ OFDM symbol of a $1^{st}$ slot and a $4^{th}$ OFDM symbol of a $2^{nd}$ slot. In each layer, the same sequence is mapped to two OFDM symbols. In this case, the reference signal sequence for the layer 0 is multiplied by an orthogonal sequence [+1 +1] and is then mapped to an OFDM symbol. The reference signal sequence for the layer 1 is multiplied by an orthogonal sequence [+1 −1] and is then mapped to an OFDM symbol. That is, when the reference signal sequence for the layer 1 is mapped to a $2^{nd}$ slot in one subframe, it is mapped by multiplying −1.

When the OCC is applied as described above, a BS which receives a reference signal can estimate a channel of the layer 0 by adding a reference signal sequence transmitted in the $1^{st}$ slot and a reference signal sequence transmitted in the $2^{nd}$ slot. In addition, the BS can estimate a channel of the layer 1 by subtracting the reference signal sequence transmitted in the $2^{nd}$ slot from the reference signal sequence transmitted in the $1^{st}$ slot. That is, by applying the OCC, the BS can identify a reference signal transmitted in each layer. Therefore, a plurality of reference signals can be transmitted by using the same resource. If the number of available cyclic shift values is 6, the number of users or the number of layers that can be multiplexed by using the OCC can be increased to up to 12.

Although it is assumed in this example that a binary format of [+1 +1] or [+1 −1] is used as the OCC, the present invention is not limited thereto, and thus various types of orthogonal sequences can be used as the OCC.

In addition, by applying the OCC, a reference signal can be multiplexed in an easier manner between users having different bandwidths.

Figure 14:
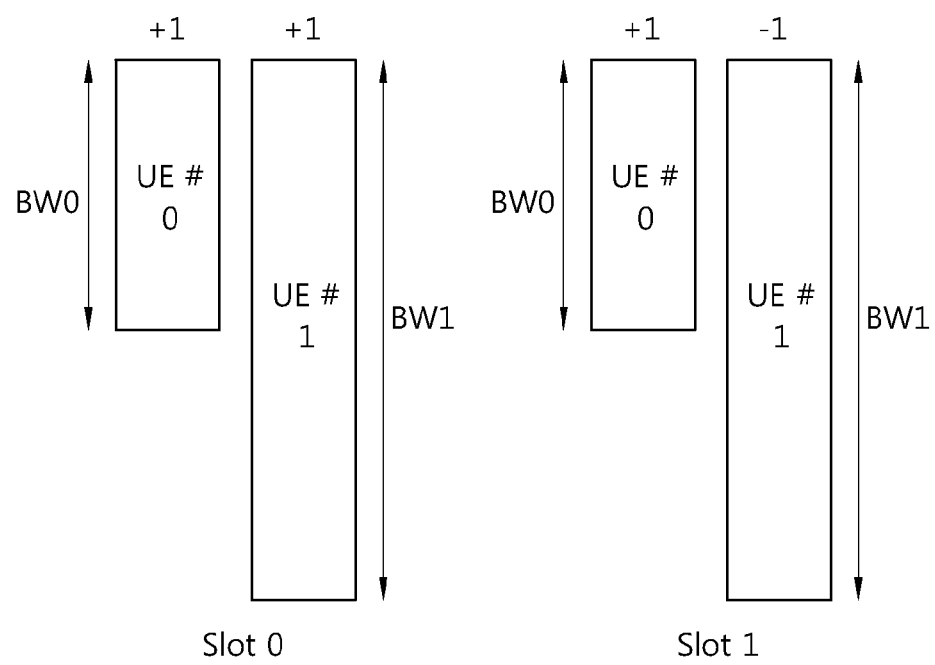
FIG. 14 shows an example of multiplexing a reference signal transmitted from two UEs having different bandwidths by applying an OCC.

FIG. 14 shows an example of multiplexing a reference signal transmitted from two UEs having different bandwidths by applying an OCC.

Each of a $1^{st}$ UE and a $2^{nd}$ UE transmits a reference signal by using a different bandwidth. The $1^{st}$ UE (or UE #0) transmits a reference signal through a $1^{st}$ bandwidth (or BW0), and the $2^{nd}$ UE (or UE #1) transmits a reference signal through a $2^{nd}$ bandwidth (or BW1). The reference signal transmitted by the 1St UE is multiplied by an orthogonal sequence [+1 +1] in each of a $1^{st}$ slot and a $2^{nd}$ slot. The reference signal transmitted by the $2^{nd}$ UE is multiplied by an orthogonal sequence [+1 −1] in each of the $1^{st}$ slot and the $2^{nd}$ slot. Accordingly, a BS which receives the reference signal from the $1^{st}$ UE and the $2^{nd}$ UE can perform channel estimation by identifying each of the two UEs.

Hereinafter, multiple-input multiple-output (MIMO) will be described. A MIMO method can be divided into two methods, i.e., per-antenna rate control (PARC) and per-user unitary rate control (RU2RC).

Figure 15:
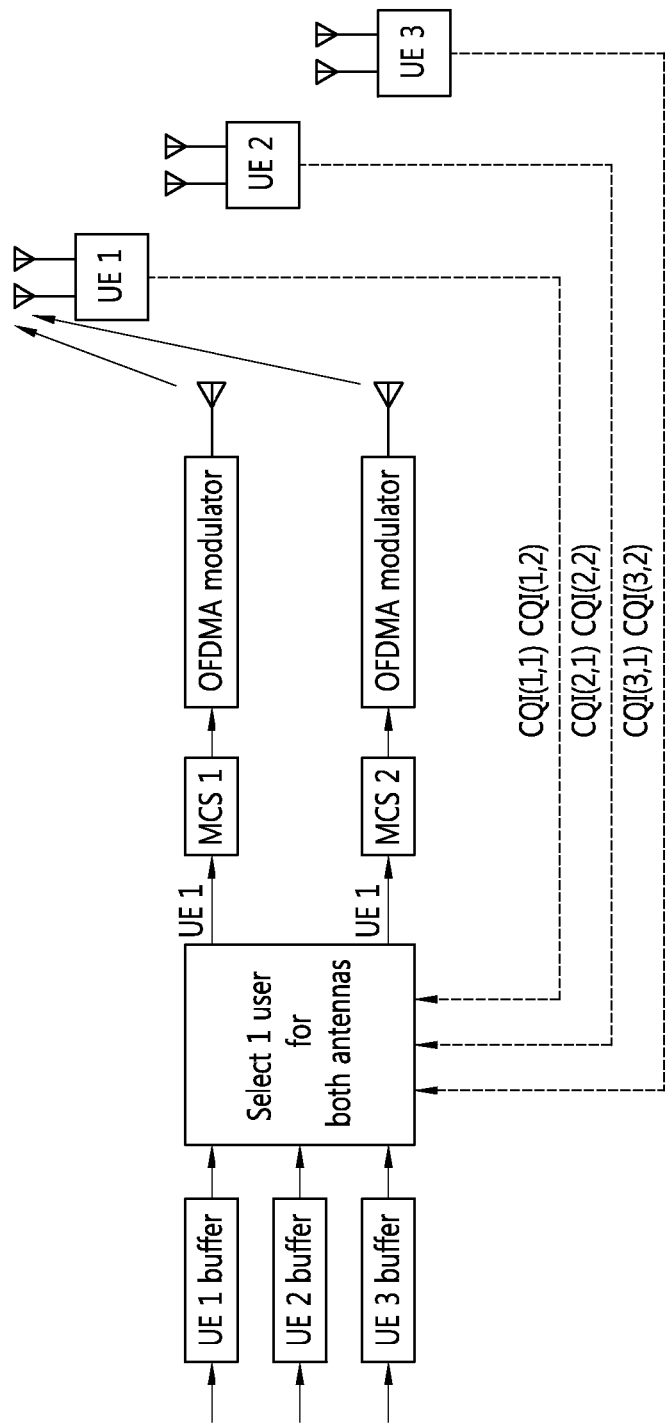
FIG. 15 shows an example of a PARC method.

FIG. 15 shows an example of a PARC method.

PARC is a method for performing MIMO by using spatial multiplexing.

According to the PARC method, spatial resources can be allocated to one UE or a plurality of UEs. When the spatial resources are allocated to one UE, it is called single-user (SU) MIMO. When the spatial resources are allocated to a plurality of UEs, it is called multi-user (MU) MIMO.

The example of FIG. 15 is a case where a PARC method is applied to SU-MIMO. When assuming 3 UEs, a BS selects one UE to which a plurality of antennas transmit data among the three 3 UEs. When a $1^{st}$ UE is selected, a modulation and coding scheme (MCS) level for each of the plurality of antennas is determined, and data is transmitted to the $1^{st}$ UE through the plurality of antennas by using an OFDMA modulator. The UEs respectively transmit channel quality indicators (CQIs) for the plurality of antennas of the corresponding UE to the BS.

Figure 16:
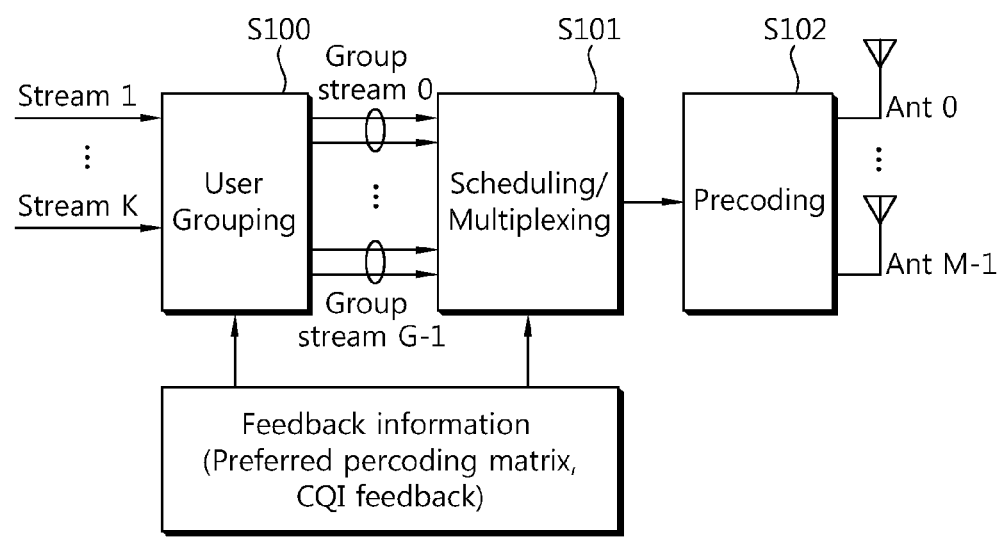
FIG. 16 shows an example of a PU2RC method.

FIG. 16 shows an example of a PU2RC method.

In PU2RC, multi-user interference is decreased by precoding data on the basis of a codebook. A BS performs grouping on a plurality of UEs to generate a plurality of group streams (step S100). The BS performs scheduling and multiplexing on the generated group stream (step S101). The BS performs precoding on each group stream by using a precoding matrix corresponding to each group (step S102), and transmits it through a plurality of antennas. When performing precoding, unitary codebook-based precoding can be used. Each UE feeds back a preferred precoding matrix, a transmit antenna, and a CQI corresponding to each transmit antenna to the BS. The BS can use feedback information when performing scheduling. As such, since the multi-user interference can be decreased by performing MIMO by the use of the precoding, a high performance gain can be obtained in a MU-MIMO environment.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in the uplink is equal to the number of carriers used in the downlink, it is necessary to configure such that all CCs are compatible with the LTE Rel-8 system.

In order to efficiently use a plurality of carriers, the plurality of carriers can be managed by media access control (MAC).

Figure 17:
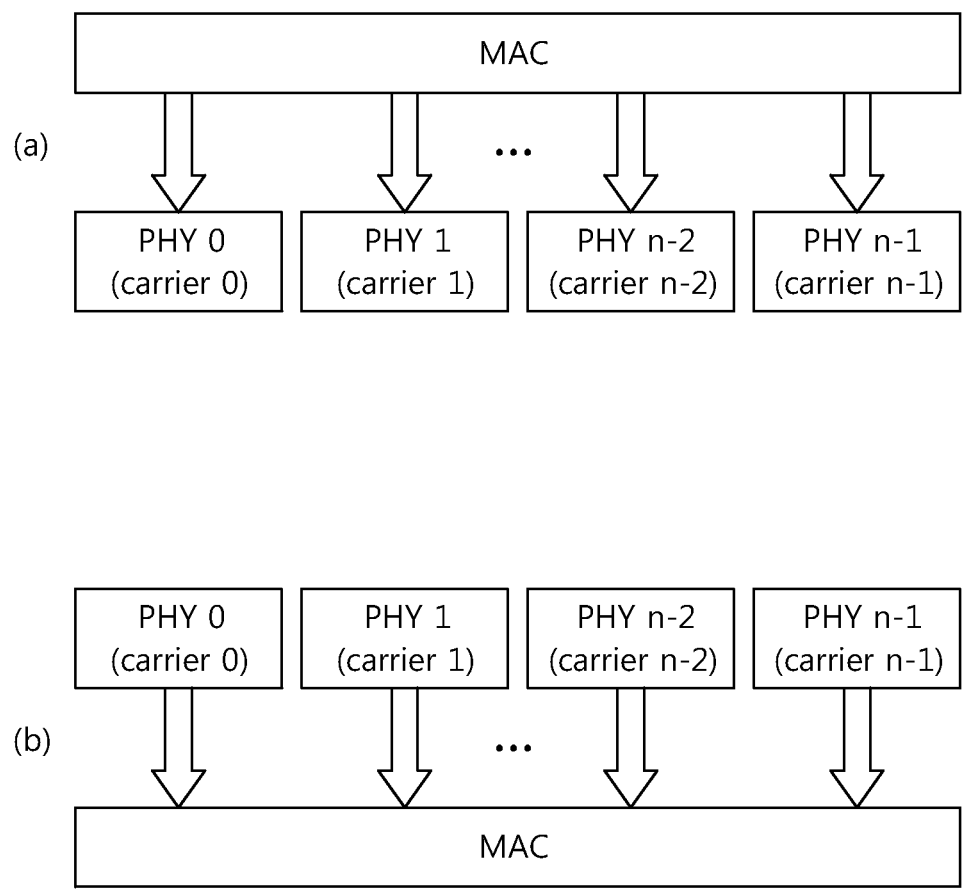
FIGS. 17 to 19 show an example of a BS and a UE which constitute a carrier aggregation system.

FIG. 17 shows an example of a BS and a UE which constitute a carrier aggregation system.

In the BS of FIG. 17(a), one MAC transmits and receives data by managing and operating all of n carriers. This is also applied to the UE of FIG. 17(b). From the perspective of the UE, one transport block and one HARQ entity may exist per CC. The UE can be scheduled simultaneously for a plurality of carriers. The carrier aggregation system of FIG. 18 can apply both to a contiguous carrier aggregation system and a non-contiguous carrier aggregation system. The respective carriers managed by one MAC do not have to be contiguous to each other, which results in flexibility in terms of resource management.

Figure 18:
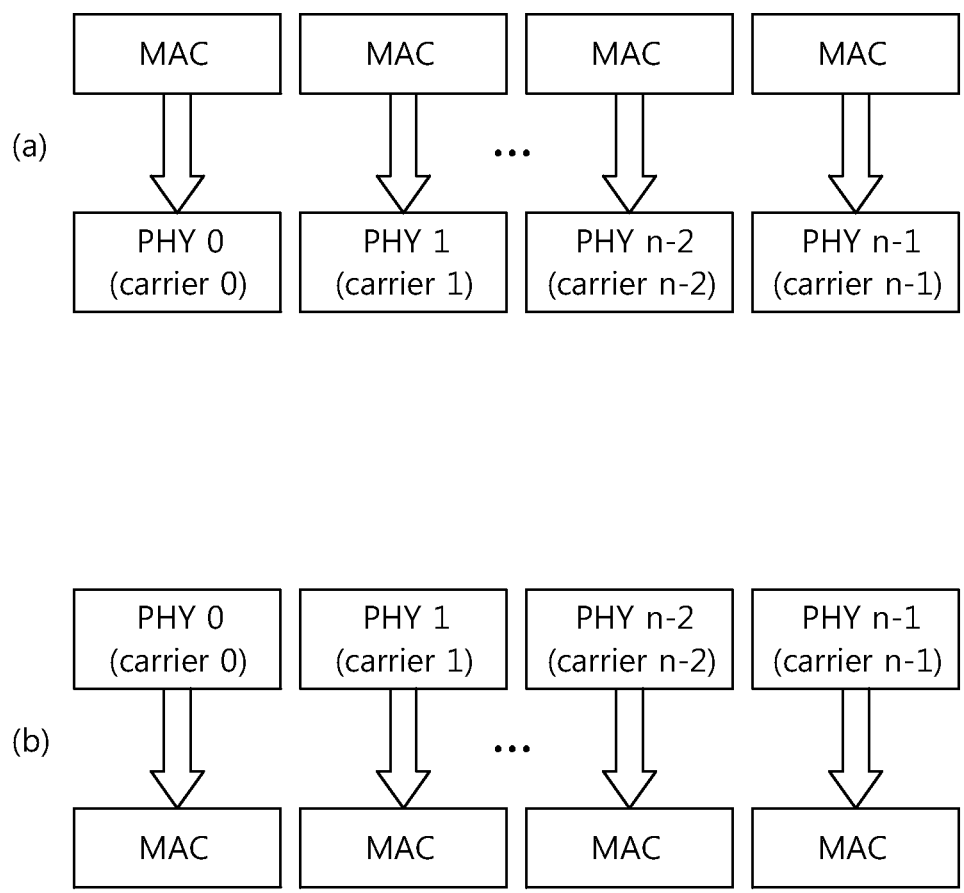
Figure 19:
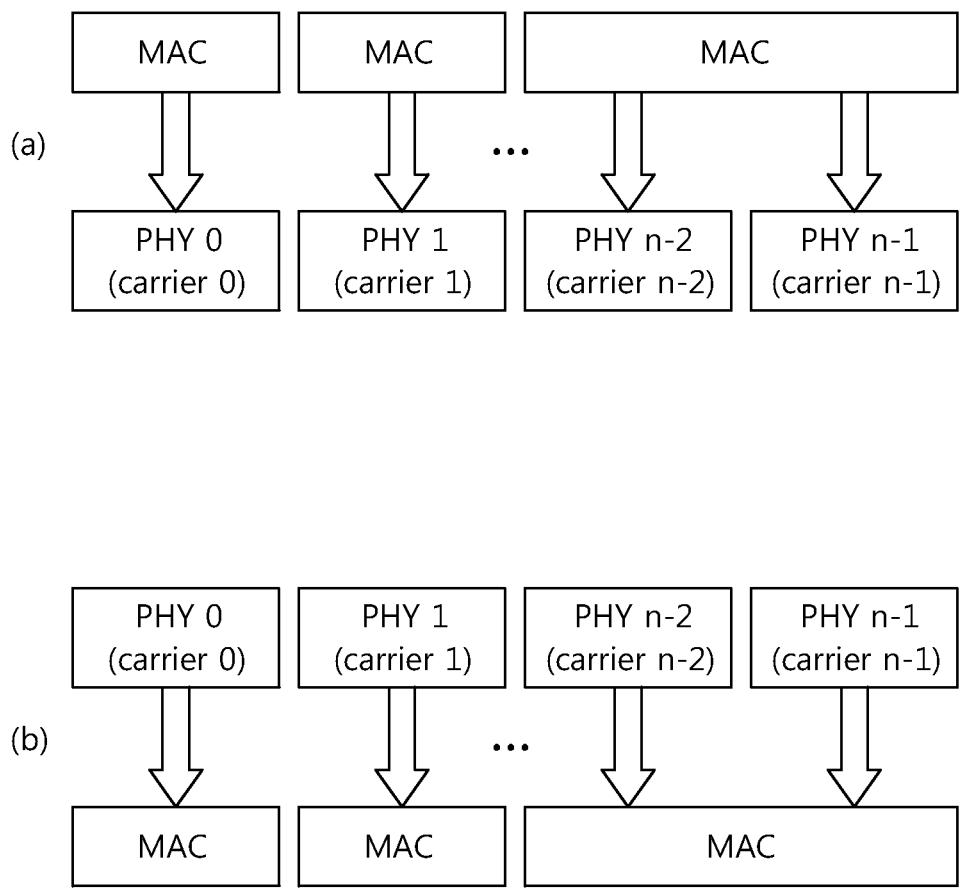

FIG. 18 and FIG. 19 show other examples of a BS and a UE which constitute a carrier aggregation system.

In the BS of FIG. 18(a) and the UE of FIG. 18(b), one MAC manages only one carrier. That is, the MAC and the carrier are 1:1 mapped. In the BS of FIG. 19(a) and the UE of FIG. 19(b), a MAC and a carrier are 1:1 mapped for some carriers, and regarding the remaining carriers, one MAC controls a plurality of carriers. That is, various combinations are possible based on a mapping relation between the MAC and the carrier.

The carrier aggregation system of FIG. 17 to FIG. 19 includes n carriers. The respective carriers may be contiguous to each other or may be separated from each other. The carrier aggregation system can apply both to UL and DL transmissions. In a TDD system, each carrier is configured to be able to perform UL transmission and DL transmission. In an FDD system, a plurality of carriers can be used by dividing them for a UL usage and a DL usage. In a typical TDD system, the number of carriers used in UL transmission is equal to that used in DL transmission, and each carrier has the same bandwidth. The FDD system can configure an asymmetric carrier aggregation system by allowing the number of carriers and the bandwidth to be different between UL and DL transmissions.

A wireless communication system can support a UL or DL HARQ.

Figure 20:
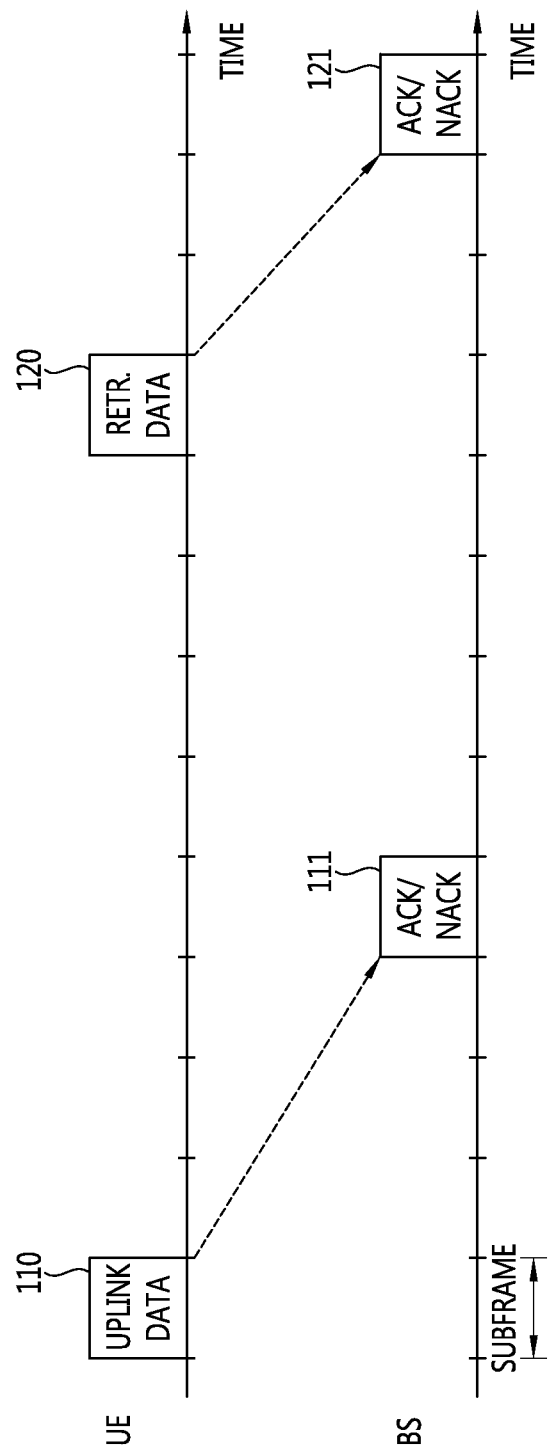
FIG. 20 shows a UL HARQ.

FIG. 20 shows a UL HARQ.

A BS receives UL data 110 from a UE through a PUSCH, and after a specific subframe elapses, transmits an ACK/NACK signal 111 through a PHICH. The ACK/NACK signal 111 corresponds to an ACK signal when the UL data 110 is successfully decoded, and corresponds to a NACK signal when the UL data 110 fails in decoding. Upon receiving the NACK signal, the UE can transmit retransmission data 120 for the UL data 110 until ACK information is received or until retransmission is performed up to a maximum number of retransmission attempts. The BS can transmit an ACK/NACK signal 121 for the retransmission data 120 through the PHICH.

The following description is about the PHICH.

Figure 21:
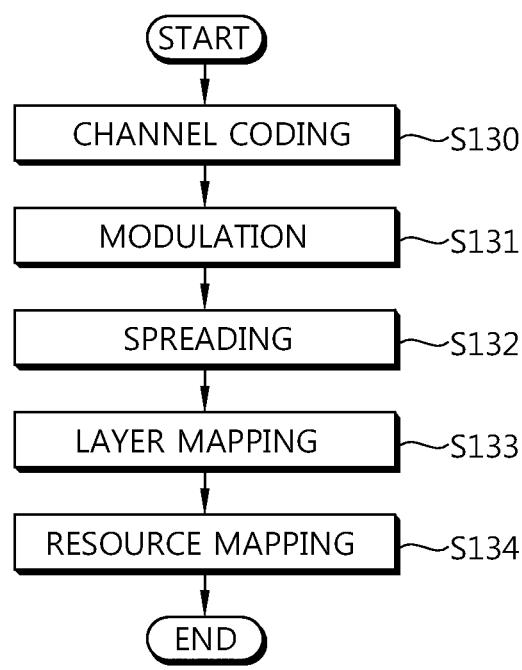
FIG. 21 is a flowchart showing transmission of an ACK/NACK signal through a PHICH.

FIG. 21 is a flowchart showing transmission of an ACK/NACK signal through a PHICH.

Since an LTE system does not support SU-MIMO in an uplink, one PHICH carries only 1-bit ACK/NACK corresponding to a PUSCH for one UE, that is, corresponding to a single stream. In step S130, the 1-bit ACK/NACK is coded into 3 bits by using a repetition code having a code rate of 1/3. In step S131, the coded ACK/NACK is modulated using binary phase shift keying (BPSK) to generate 3 modulation symbols. In step S132, the modulation symbols are spread by using a spreading factor (SF) of 4 in a normal CP structure and by using an SF of 2 in an extended CP structure. An orthogonal sequence is used when spreading the modulation symbols, and the number of orthogonal sequences used in the spreading is SFx2 to apply I/O multiplexing. PHICHs which are spread by using SFx2 orthogonal sequences can be defined as one PHICH group. In step S133, layer mapping is performed on the spread symbols. In step S124, the layer-mapped symbols are transmitted by being mapped to resources.

The PHICH carries HARQ ACK/NACK depending on PUSCH transmission. A plurality of PHICHs mapped to resource elements of the same set constitute a PHICH group. Each PHICH in the PHICH group is identified by a different orthogonal sequence. In the FDD system, $N_{PHICH}^{group}$ i.e., the number of PHICH groups, is constant in all subframes, and can be determined by Equation 13 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 13]

In Equation 13, $N_g$ is transmitted in a higher layer through a physical broadcast channel (PBCH), where $N_g \in \{1/6, 1/2, 1, 2\}$. The PBCH carries essential system information when a UE communicates with a BS. The system information transmitted through the PBCH is called a master information block (MIB). In comparison, system information transmitted through a physical downlink control channel (PDCCH) is called a system information block (SIB). $N_{RB}^{DL}$ denotes a DL bandwidth configuration expressed with a multiple of $N_{sc}^{RB}$ which is an RB size in a frequency domain. A PHICH group index $n_{PHICH}^{group}$ is any one integer from 0 to $N_{PHICH}^{group}-1$.

A resource used in the PHICH can be determined based on a lowest physical resource block (PRB) index in resource allocation of the PUSCH and a cyclic shift (CS) value of a demodulation reference signal (DMRS) transmitted using a UL grant. A resource to which the PHICH is mapped (hereinafter, a PHICH resource) can be expressed by an index pair ($n_{PHICH}^{group}$, $n_{PHICH}^{seq}$). Herein, $n_{PHICH}^{group}$ denotes a PHICH group index, and $n_{PHICH}^{seq}$ denotes an orthogonal sequence index in the PHICH group. The index pair ($n_{PHICH}^{group}$, $n_{PHICH}^{seq}$) can be determined by Equation 14 below.

$$n_{PHICH}^{group} = \left( I_{PRB\_RA}^{lowest\_index} + n_{DMRS} \right) \bmod N_{PHICH}^{group} + I_{PHICH} N_{PHICH}^{group}$$ [Equation 14]

$$n_{PHICH}^{seq} = \left( \lfloor I_{PRB\_RA}^{lowest\_index} / N_{PHICH}^{group} \rfloor + n_{DMRS} \right) \bmod 2N_{SF}^{PHICH}$$

$n_{DMRS}$ can be determined based on a "cyclic shift for DMRS" field in a DCI format 0 according to Table 7. Table 7 is identical to Table 6.

TABLE 7

| Cyclic Shift for DMRS Field in DCI format 0 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In addition, in a case where a PDCCH including the DCI format 0 is not transmitted in the same transport block, $n_{DMRS}$ may be 0 if a first PUSCH is semi-persistently scheduled in the same transport block or if the first PUSCH is scheduled in the same transport block by a random access response grant.

Returning to Equation 14, $N_{SF}^{PHICH}$ denotes a spreading factor (SF) used in PHICH modulation. $I_{PRB\_RA}^{lowest\_index}$ is a lowest PRB index among PRBs of a slot in which a PUSCH corresponding to a PHICH is transmitted. $I_{PHICH}$ has a value of 0 or 1.

An orthogonal sequence used in the PHICH can be determined by Table 8. The orthogonal sequence in use may vary depending on a value $n_{PHICH}^{seq}$ or a CP structure.

TABLE 8

| Sequence Index ($n_{PHICH}^{seq}$) | Orthogonal Sequence | |
|---|---|---|
| | Normal CP ($N_{SF}^{PHICH}=4$) | Extended CP ($N_{SF}^{PHICH}=2$) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The plurality of PHICHs can be simultaneously allocated. In particular, the plurality of PHICHs can be allocated in a system such as a carrier aggregation system, MU-MIMO, a cooperative multi-point (CoMP) transmission scheme, etc.

Figure 22:
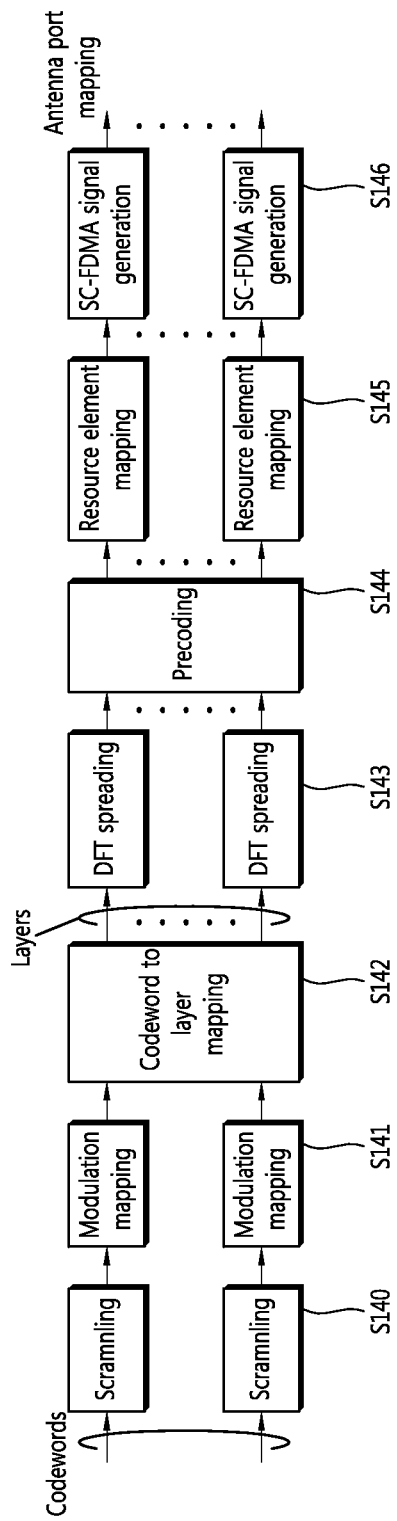
FIG. 22 is a block diagram showing a MIMO transmission process in an uplink to which an SC-FDMA transmission method is applied.

FIG. 22 is a block diagram showing a MIMO transmission process in an uplink to which an SC-FDMA transmission method is applied.

In order to perform MIMO transmission, a plurality of codewords can be used. If it is assumed that the number of codewords is 2, each codeword is scrambled in step S140, the codeword is mapped to a modulation symbol in step S141, and the symbols are mapped to respective layers in step S142. Each of the layers is DFT-spread in step S143, and is precoded in step S144. A stream generated by being precoded is mapped in step S145, and is transmitted through each antenna by using an SC-FDMA signal generator in step S146. To facilitate HARQ for an uplink, two independent ACK/NACK signals are required for the respective codewords.

Meanwhile, when a plurality of PHICHs is simultaneously allocated, PHICH resources may collide with each other. Hereinafter, a carrier aggregation system is assumed as an environment where the plurality of PHICHs is allocated, and one carrier is assumed in each component carrier.

Figure 23:
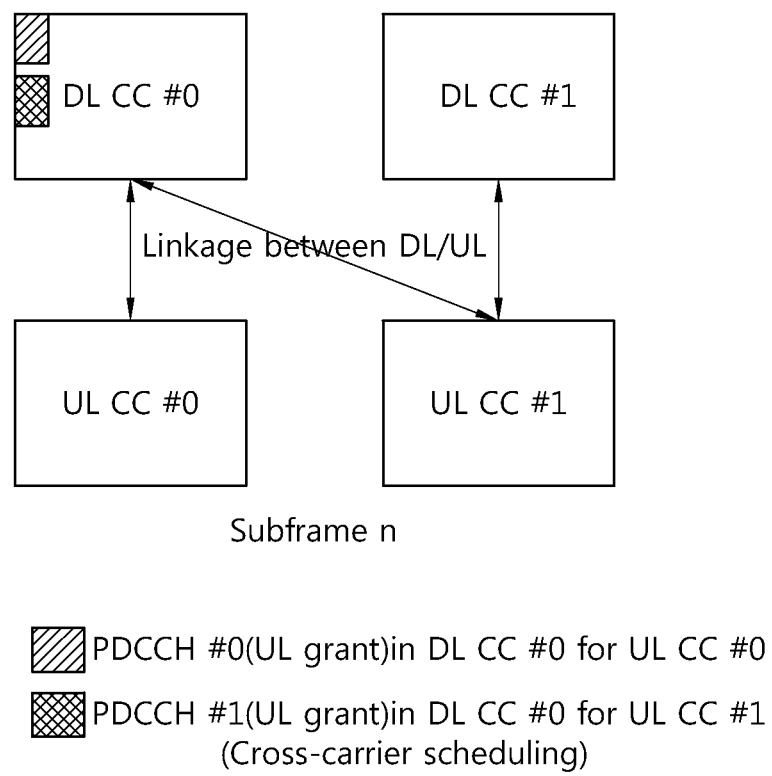
Figure 24:
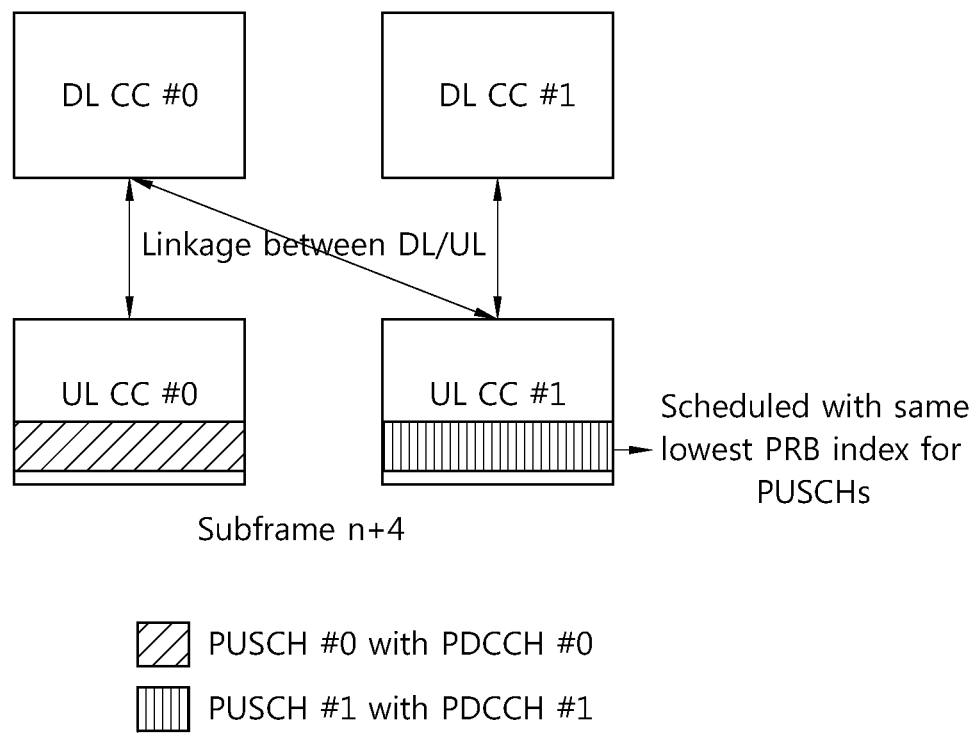

FIG. 23 to FIG. 25 show examples of a case where PHICH resources collide with each other when a plurality of PHICHs is allocated. It is assumed that the number of carriers is 2.

In FIG. 23, a BS transmits to a UE a UL grant for allocating a PUSCH resource of the UE with respect to each component carrier in a subframe n. A $1^{st}$ UL grant for a $1^{st}$ carrier (or CC #0) is transmitted through a $1^{st}$ PDCCH (or PDCCH #0) of the $1^{st}$ carrier. A $2^{nd}$ grant for a $2^{nd}$ carrier (or CC #1) is also transmitted through a $2^{nd}$ PDCCH (or PDCCH #1) in the $1^{st}$ carrier. That is, UL transmission of the $2^{nd}$ carrier is scheduled by using cross-carrier scheduling.

In FIG. 24, a UE transmits UL data through two PUSCHs scheduled in each component carrier by a UL grant in a subframe (n+4). $1^{st}$ UL data is transmitted through a $1^{st}$ PUSCH (or PUSCH #0) scheduled to the $1^{st}$ carrier by the $1^{st}$ UL grant. $2^{nd}$ UL data is transmitted through a $2^{nd}$ PUSCH (or PUSCH #1) scheduled to the $2^{nd}$ carrier by the $2^{nd}$ UL grant. In this case, a resource to which the PUSCH is mapped in each component carrier may have the same lowest PRB index.

In FIG. 25, a BS transmits ACK/NACK for each received UL data to a UE through a PHICH in a subframe (n+8). In this case, if resources in component carriers for transmitting respective UL data have the same lowest PRB index and the same cyclic shift value, PHICH resource positions determined by Equation 14 may be identical to each other. Accordingly, the PHICH resources may collide when a plurality of PHICHs are allocated.

Although a carrier aggregation system is assumed in FIG. 23 to FIG. 25, the aforementioned collision of the PHICH resources may occur when the plurality of PHICHs are allocated in a MU-MIMO environment. Alternatively, the collision of the PHICH resources may also occur in an SU-MIMO environment since an ACK/NACK signal for each codeword can be transmitted through the same PHICH when the UE transmits a plurality of codewords. Although the collision problem can be solved by varying a cyclic shift value allocated to each PUSCH, the problem may still occur according to the number of codewords, the number of carriers, etc.

Hereinafter, a method for solving a collision problem of PHICH resources will be described.

Figure 26:
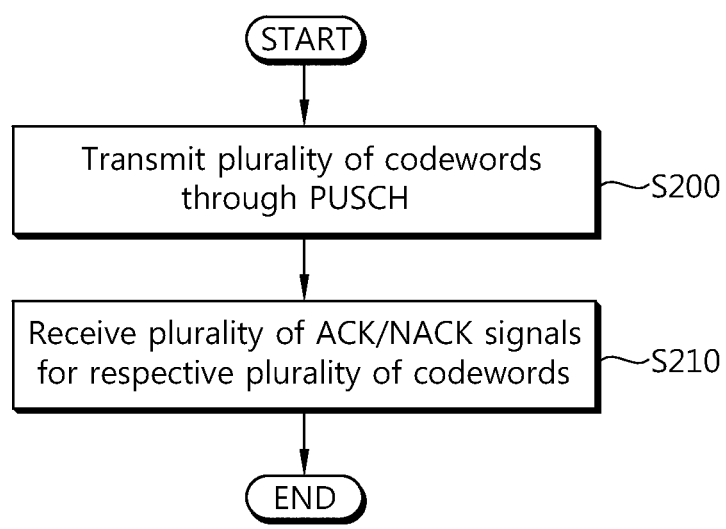
FIG. 26 is a flowchart showing an embodiment of the proposed method of performing HARQ.

FIG. 26 is a flowchart showing an embodiment of the proposed method of performing HARQ.

In step S200, a UE transmits a plurality of codewords to a BS through a PUSCH.

In step S210, the UE receives a plurality of ACK/NACK signals indicating whether each of the plurality of codewords is received, from the BS through PHICHs corresponding to the respective codewords. In this case, resources to which the respective PHICHs are mapped do not collide with each other.

Various methods can be proposed to avoid collision of the plurality of PHICH resources.

1) The PHICH resource can be predetermined.

For example, an index of the PHICH resource can be predetermined by Equation 15.

[Equation 15]

$$n_{PHICH}^{group} = ((I_{PRB\_RA}^{lowest\_index} + \beta) + n_{DMRS}) \bmod N_{PHICH}^{group} + I_{PHICH} N_{PHICH}^{group}$$

$$n_{PHICH}^{seq} = (\lfloor (I_{PRB\_RA}^{lowest\_index} + \beta) / N_{PHICH}^{group} \rfloor + n_{DMRS}) \bmod 2 N_{SF}^{PHICH}$$

Equation 15 has a format in which $I_{PRB\_RA}^{lowest\_index}+\beta$ is substituted to Equation 14 for determining a resource to which the PHICH is mapped instead of $I_{PRB\_RA}^{lowest\_index}$.

The PHICH resource can be determined based on the predefined value $\beta$. The PHICH resources to which a PHICH for transmitting an ACK/NACK signal for a plurality of codewords is allocated can be determined such that their values $\beta$ are different, thereby being able to avoid collision.

The value $\beta$ may be predetermined to a specific integer. For example, if the number of codewords is 2, the value $\beta$ can be defined to either +1 or −1. $\beta=1$ may indicate a second lowest PRB index among resources to which the PUSCH corresponding to the PHICH is physically mapped. That is, it indicates a $(I_{PRB\_RA}^{lowest\_index}+1)^{th}$ PRB when a lowest index of a PRB among resources to which the PUSCH is mapped is denoted as $I_{PRB\_RA}^{lowest\_index}$. $\beta=-1$ indicates a maximum PRB index among resources to which a PUSCH corresponding to a PHICH of another carrier or another UE physically adjacent is mapped. As such, it is possible to utilize resources by increasing the number of resources to which the PHICH can be mapped by allocating the plurality of PHICH resources, and a gain can be obtained when performing scheduling.

Figure 27:
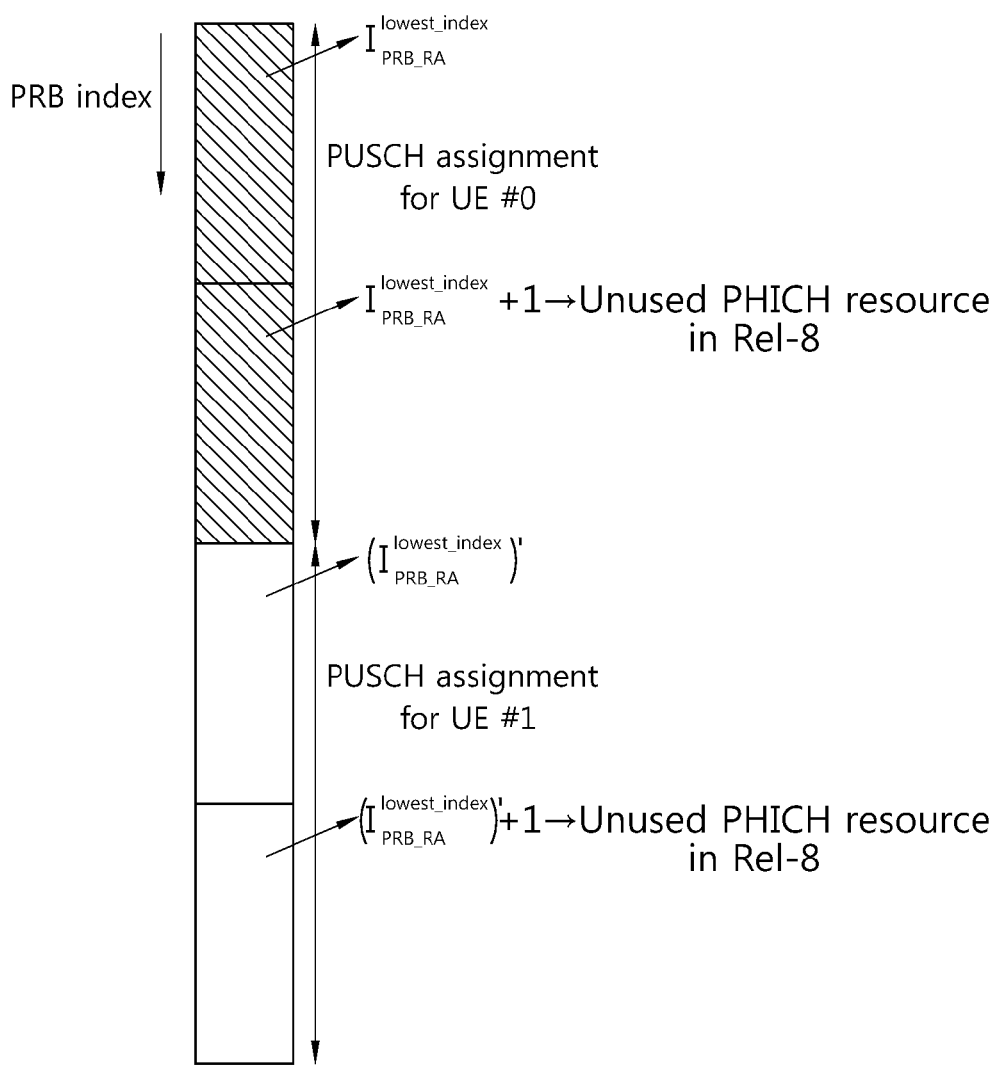
FIG. 27 is an embodiment of a method of allocating a PHICH resource.

FIG. 27 is an embodiment of a method of allocating a PHICH resource. The embodiment of FIG. 27 shows a case where, when one UE transmits two codewords in a UL SU-MIMO environment, PHICH resources for the respective two codewords are allocated. An SC-FDMA transmission method can be used in the UL SU-MIMO environment. The SC-FDMA transmission method can be performed according to the block diagram of FIG. 22. In the embodiment of FIG. 27, the PHICH resources are allocated by Equation 15, and $\beta$ is determined to either 0 to 1. When two or more PRBs are allocated to the UE, a PHICH corresponding to a PRB having a lowest index according to Equation 14 is used for ACK/NACK transmission, and a PHICH corresponding to a PRB having a second lowest index may not be used. In this case, if $\beta=1$, a plurality of ACKs/NACKs can be transmitted by using the unused PHICH, and thus the plurality of PHICHs can be effectively supported.

Referring to FIG. 27, with respect to a first UE (or UE #0), a PHICH resource for a $1^{st}$ codeword is determined based on an index $I_{PRB\_RA}^{lowest\_index}$, and a PHICH resource for a $2^{nd}$ codeword is determined based on an index $I_{PRB\_RA}^{lowest\_index}+1$. That is, the PHICH resource for the $1^{st}$ codeword corresponds to $\beta=0$ in Equation 15, and the PHICH resource for the $2^{nd}$ codeword corresponds to $\beta=1$ in Equation 15. The PHICH resource for the $2^{nd}$ codeword of the $1^{st}$ UE is a resource which is not used in LTE rel-8. In addition, with respect to a $2^{nd}$ UE (or UE #1), a PHICH resource for a $1^{st}$ codeword is determined based on $(I_{PRB\_RA}^{lowest\_index})'$, and a PHICH resource for a $2^{nd}$ codeword is determined based on $(I_{PRB\_RA}^{lowest\_index})'+1$. Likewise, the PHICH resource for the $1^{st}$ codeword corresponds to $\beta=0$ in Equation 15, and the PHICH resource for the $2^{nd}$ codeword corresponds to $\beta=1$ in Equation 15. The PHICH resource for the $2^{nd}$ codeword of the $1^{st}$ UE is a resource which is not used in LTE rel-8. The PHICH resource for the $2^{nd}$ codeword of the $2^{nd}$ UE is a resource which is not used in LTE rel-8. Therefore, from the perspective of the BS, a more amount of PHICH resources can be effectively used to transmit a plurality of PHICHs.

Although it is assumed in the embodiment of FIG. 27 that a UE transmits two codewords in a UL SU-MIMO environment and thus PHICH resources for the respective codewords are allocated based on Equation 15, the PHICH resources can also be allocated in the same manner in an environment of a plurality of component carriers or MU-MIMO. For example, if three carriers are present, a plurality of integers can be assigned to a value $\beta$ in such a manner that $\beta=0$, $\beta=1$, and $\beta=2$ are assigned respectively for a $1^{st}$ carrier, a $2^{nd}$ carrier, and a $3^{rd}$ carrier. Although β=1 is shown for example in the embodiment of FIG. 27, this is for exemplary purposes only, and thus β can be defined to various values.

Alternatively, in the above example, the PHICH for the $1^{st}$ codeword and the PHICH for the $2^{nd}$ codeword can be simultaneously mapped to a resource corresponding to a lowest PRB index. That is, the PHICH resource for the $1^{st}$ codeword and the PHICH resource for the $2^{nd}$ codeword are equally allocated in a signaling or predetermined manner. This can be called PHICH bundling. According to the PHICH bundling, representative ACK/NACK can be transmitted through a representative PHICH which represents the plurality of PHICHs. For example, when ACK is transmitted through all of the plurality of PHICHs, the ACK can be transmitted through the representative PHICH. In addition, when NACK is transmitted through at least one of the plurality of PHICHs, NACK can be transmitted through the representative PHICH.

Alternatively, an index of a PHICH resource can be predetermined by Equation 16.

$$n_{PHICH}^{group} = $$
$$(I_{PRB\_RA}^{lowest\_index} + n_{DMRS} + \alpha) \bmod N_{PHICH}^{group} + I_{PHICH} N_{PHICH}^{group}$$
$$n_{PHICH}^{seq} = (\lfloor I_{PRB\_RA}^{lowest\_index} / N_{PHICH}^{group} \rfloor + n_{DMRS} + \alpha) \bmod 2N_{SF}^{PHICH}$$
[Equation 16]

α may be a predetermined parameter. For example, when it is assumed that there are 2 codewords, a carrier aggregation system consists of 5 carriers, and a MU-MIMO system includes 4 users, then the value α can be determined by considering the number of codewords, the number of carriers, and the number of users.

Equation 17 shows an example of an equation for determining the value α.

$$\alpha = 20 \cdot n_{CW} + (5 \cdot n_{UE} + n_{CC})$$ [Equation 17]

Equation 18 is another example of an equation for determining the value α.

$$\alpha = 2 \cdot (5 \cdot n_{UE} + n_{CC}) + n_{CW}$$ [Equation 18]

$n_{CW}$, $n_{CC}$, and $n_{UE}$ denote parameters related to a codeword, a component carrier index, and a UE, respectively. $n_{CW}$, $n_{CC}$, and $n_{UE}$ can be predetermined in a system. Equation 17 and Equation 18 are one example of defining the value α, where a can be determined in various manners by combining $n_{CW}$, $n_{CC}$, and $n_{UE}$.

2) The BS can regulate the plurality of PHICH resources. For this, a new offset can be defined and signaled. The offset can be defined by considering a situation where the plurality of PHICH resources can collide, that is, by considering a plurality of codewords, MU-MIMO, a carrier aggregation system, etc. For example, when it is assumed that there are 2 codewords, a carrier aggregation system consists of 5 carriers, and a MU-MIMO system includes 4 users, then 40 states (i.e., 2×5×4) can be present, and an offset for indicating the 40 states can be defined.

Equation 19 shows an example of a PHICH resource index determined based on the offset. The PHICH resource can be represented with an index pair $(n_{PHICH}^{group}, n_{PHICH}^{seq})$, where $n_{PHICH}^{group}$ is a PHICH group index and $n_{PHICH}^{seq}$ is an orthogonal sequence index in the PHICH group. This is a modification of Equation 14.

$$n_{PHICH}^{group} = $$
$$(I_{PRB\_RA}^{lowest\_index} + n_{OFFSET}) \bmod N_{PHICH}^{group} + I_{PHICH} N_{PHICH}^{group}$$
$$N_{PHICH}^{seq} = (\lfloor I_{PRB\_RA}^{lowest\_index} / N_{PHICH}^{group} \rfloor + n_{OFFSET}) \bmod 2N_{SF}^{PHICH}$$
[Equation 19]

In Equation 19, the PHICH resource index is determined based on $n_{OFFSET}$. $n_{OFFSET}$ is any one integer between 0 to 39.

Equation 20 shows another example of a PHICH resource index determined based on the offset.

$$n_{PHICH}^{group} = (I_{PRB\_RA}^{lowest\_index} + n_{DMRS} + n_{CW} + n_{CC}) \bmod N_{PHICH}^{group} + I_{PHICH} N_{PHICH}^{group}$$
$$N_{PHICH}^{seq} = (\lfloor I_{PRB\_RA}^{lowest\_index} / N_{PHICH}^{group} \rfloor + n_{DMRS} + n_{CW} + n_{CC}) \bmod 2N_{SF}^{PHICH}$$
[Equation 20]

Equation 21 shows another example of the PHICH resource index determined based on the offset.

$$n_{PHICH}^{group} = $$
$$(I_{PRB\_RA}^{lowest\_index} + n_{DMRS} + n_{CW} + n_{CC} + n_{OCC}) \bmod N_{PHICH}^{group} + I_{PHICH} N_{PHICH}^{group}$$
$$n_{PHICH}^{seq} = (\lfloor I_{PRB\_RA}^{lowest\_index} / N_{PHICH}^{group} \rfloor + n_{DMRS} + n_{CW} + n_{CC} + n_{OCC}) \bmod 2N_{SF}^{PHICH}$$
[Equation 21]

$n_{CW}$, $n_{CC}$, and $n_{OCC}$ denote parameters regarding a codeword, a component carrier index, and an OCC, respectively. While the offset is determined by one parameter of $n_{OFFSET}$ in Equation 19, the PHICH resource index is determined by a plurality of parameters of $n_{CW}$, $n_{CC}$, or $n_{OCC}$ in Equation 20 or Equation 21.

Equation 22 shows another example of the PHICH resource index determined based on the offset.

$$n_{PHICH}^{group} = $$
$$(I_{PRB\_RA}^{lowest\_index} + N_{DMRS} + \alpha) \bmod N_{PHICH}^{group} + I_{PHICH} N_{PHICH}^{group}$$
$$n_{PHICH}^{seq} = (\lfloor I_{PRB\_RA}^{lowest\_index} / N_{PHICH}^{group} \rfloor + n_{DMRS} + \alpha) \bmod 2N_{SF}^{PHICH}$$
[Equation 22]

In Equation 22, the PHICH resource index is determined by using the offset α in addition to $n_{DMRS}$. α is signaled by the BS.

3) The PHICH resource can be determined by a cyclic shift value $n_{DMRS}$ in a DCI format. For example, when assuming two codewords, a PHICH resource for a $1^{st}$ codeword can be determined by a function of $n_{DMRS}$, and a PHICH resource for a $2^{nd}$ codeword can be determined by a function of $n_{DMRS+\alpha}$. α and the cyclic shift value may be any one integer ranging from 0 to 11. That is, when α=1, the PHICH for the $1^{st}$ codeword can be determined by a lowest PRB index and $n_{DMRS}$, and the PHICH for the $2^{nd}$ codeword can be determined by a lowest PRB and $n_{DMRS}+1$.

In this case, the cyclic shift value for determining the PHICH resource for each codeword can be determined by a cyclic shift value for each layer. For example, when assuming 4 layers, 4 cyclic shift values can be present for a DMRS of the respective layers. For example, cyclic shift offsets for layers 0, 1, 2, and 3 may be respectively 0, 6, 3, and 9. In this case, if $n_{DRMS}=3$, cyclic shift values of the respective layers may be 3(3+0), 9(3+6), 6(3+3), and 0((3+9)mod 12), respectively. A cyclic shift offset or a cyclic shift value of each layer can be predetermined or can be signaled by a higher layer. In this example, PHICH resources for two codewords can be determined by using some of the cyclic shift value given to the respective layers. For example, an index of a PHICH resource for a $1^{st}$ codeword may be 3, and an index of a PHICH resource for a $2^{nd}$ codeword may be 6.

4) In a clustered DFT-s OFDM system, a plurality of PHICH resources can be determined by a lowest PRB index in each cluster. An index of the PHICH resource in each cluster can be normalized by Equation 23.

$$n_{PHICH,CW\#1}^{group,UE\#1} = \qquad \text{[Equation 23]}$$
$$((I_{PRB}+\beta)+n_{DMRS}) \bmod N_{PHICH}^{group} + I_{PHICH} N_{PHICH}^{group}$$
$$n_{PHICH,CW\#1}^{seq,UE\#1} =$$
$$(\lfloor(I_{PRB}+\beta)/N_{PHICH}^{group}\rfloor + n_{DMRS}) \bmod 2N_{SF}^{PHICH}$$

In Equation 23, $I_{PRB}$ is a lowest PRB index among PRBs constituting each cluster. $\beta$ can be determined by an index of a cluster, a codeword, a component carrier index, the number of users, etc. In Equation 23, if $\beta=1$, the PHICH resource can be allocated in the same format as shown in the embodiment of FIG. 27.

Figure 28:
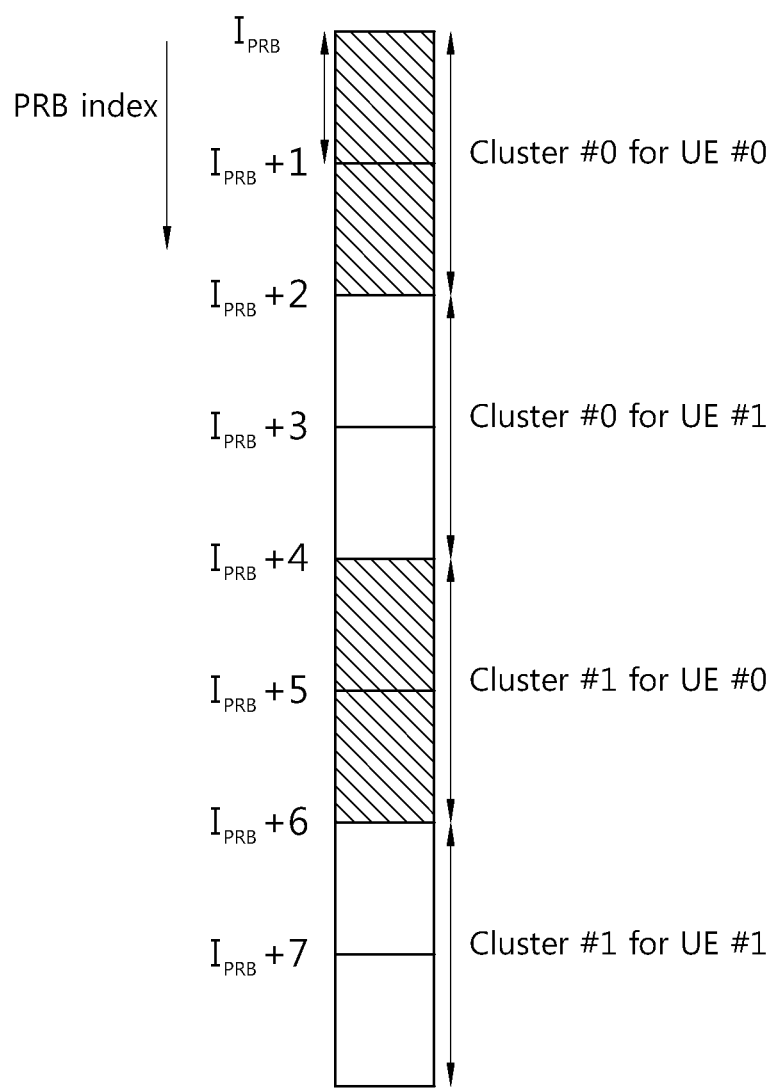
FIG. 28 shows an embodiment of a PHICH resource allocation method when two UEs respectively transmit two codewords in a clustered DFT-s OFDM system including two clusters and a UL SU-MIMO environment.

FIG. 28 shows an embodiment of a PHICH resource allocation method when two UEs respectively transmit two codewords in a clustered DFT-s OFDM system including two clusters and a UL SU-MIMO environment. Referring to FIG. 28, a PHICH resource for a $1^{st}$ codeword (or CW #0) is determined based on a lowest PRB index of a $1^{st}$ cluster (or cluster #0), and a PHICH resource for a $2^{nd}$ codeword (or CW #1) is determined based on a lowest PRB index of a $2^{nd}$ cluster (or cluster #1).

An index of a PHICH resource for a $1^{st}$ UE (or UE #0) can be determined by Equation 24 and Equation 27. Equation 24 shows an index of a PHICH resource for the $1^{st}$ codeword (or CW #0) of the $1^{st}$ UE (or UE #0).

$$n_{PHICH,CW\#0}^{group,UE\#0} = \qquad \text{[Equation 24]}$$
$$(I_{PRB}+n_{DMRS}) \bmod N_{PHICH}^{group} + I_{PHICH} N_{PHICH}^{group}$$
$$n_{PHICH,CW\#0}^{seq,UE\#0} = (\lfloor I_{PRB}/N_{PHICH}^{group}\rfloor + n_{DMRS}) \bmod 2N_{SF}^{PHICH}$$

Equation 25 shows an index of a PHICH resource for the $2^{nd}$ codeword (or CW #1) of the $1^{st}$ UE (or UE #0).

$$n_{PHICH,CW\#1}^{group,UE\#0} = \qquad \text{[Equation 25]}$$
$$((I_{PRB}+4)+n_{DMRS}) \bmod N_{PHICH}^{group} + I_{PHICH} N_{PHICH}^{group}$$
$$n_{PHICH,CW\#1}^{seq,UE\#0} = (\lfloor(I_{PRB}+4)/N_{PHICH}^{group}\rfloor + n_{DMRS}) \bmod 2N_{SF}^{PHICH}$$

An index of a PHICH resource for a $2^{nd}$ UE (or UE #1) can be determined by Equation 25 and Equation 26. Equation 26 shows an index of a PHICH resource for the $1^{st}$ codeword (or CW #0) of the $2^{nd}$ UE (or UE #1).

$$n_{PHICH,CW\#0}^{group,UE\#1} = \qquad \text{[Equation 26]}$$
$$((I_{PRB}+2)+n_{DMRS}) \bmod N_{PHICH}^{group} + I_{PHICH} N_{PHICH}^{group}$$
$$n_{PHICH,CW\#0}^{seq,UE\#1} = (\lfloor(I_{PRB}+2)/N_{PHICH}^{group}\rfloor + n_{DMRS}) \bmod 2N_{SF}^{PHICH}$$

Equation 27 shows an index of a PHICH resource for the $2^{nd}$ codeword (or CW #1) of the $2^{nd}$ UE (or UE #1).

$$n_{PHICH,CW\#1}^{group,UE\#1} = \qquad \text{[Equation 27]}$$
$$((I_{PRB}+6)+n_{DMRS}) \bmod N_{PHICH}^{group} + I_{PHICH} N_{PHICH}^{group}$$
$$n_{PHICH,CW\#1}^{seq,UE\#1} = (\lfloor(I_{PRB}+6)/N_{PHICH}^{group}\rfloor + n_{DMRS}) \bmod 2N_{SF}^{PHICH}$$

Alternatively, in Equation 23, a may include an offset. For example, when 4 PHICHs are transmitted, regarding $1^{st}$ PHICH (or PHICH #0) to $4^{th}$ PHICH (or PHICH #3) resources for one UE, indices of the PHICH resources can be determined by Equations 28 to 31.

$$n_{PHICH\#0}^{group,UE\#0} = (I_{PRB}+n_{DMRS}) \bmod N_{PHICH}^{group} + I_{PHICH} N_{PHICH}^{group} \qquad \text{[Equation 28]}$$
$$n_{PHICH\#0}^{seq,UE\#0} = (\lfloor I_{PRB}/N_{PHICH}^{group}\rfloor + n_{DMRS}) \bmod 2N_{SF}^{PHICH}$$

$$n_{PHICH\#1}^{group,UE\#0} = \qquad \text{[Equation 29]}$$
$$((I_{PRB}+1)+n_{DMRS}) \bmod N_{PHICH}^{group} + I_{PHICH} N_{PHICH}^{group}$$
$$n_{PHICH\#1}^{seq,UE\#0} = (\lfloor(I_{PRB}+1)/N_{PHICH}^{group}\rfloor + n_{DMRS}) \bmod 2N_{SF}^{PHICH}$$

$$n_{PHICH\#2}^{group,UE\#0} = \qquad \text{[Equation 30]}$$
$$((I_{PRB}+4)+n_{DMRS}) \bmod N_{PHICH}^{group} + I_{PHICH} N_{PHICH}^{group}$$
$$n_{PHICH\#2}^{seq,UE\#0} = (\lfloor(I_{PRB}+4)/N_{PHICH}^{group}\rfloor + n_{DMRS}) \bmod 2N_{SF}^{PHICH}$$

$$n_{PHICH\#3}^{group,UE\#0} = \qquad \text{[Equation 31]}$$
$$((I_{PRB}+5)+n_{DMRS}) \bmod N_{PHICH}^{group} + I_{PHICH} N_{PHICH}^{group}$$
$$n_{PHICH\#3}^{seq,UE\#0} = (\lfloor(I_{PRB}+5)/N_{PHICH}^{group}\rfloor + n_{DMRS}) \bmod 2N_{SF}^{PHICH}$$

Alternatively, the PHICH resource can be determined by a cyclic shift value $n_{DMRS}$ in a DCI format. $n_{DMRS}$ of a $1^{st}$ cluster can be used to determine a PHICH resource for a $1^{st}$ codeword, and $n_{DMRS}$ of a $2^{nd}$ cluster can be used to determine a PHICH resource for a $2^{nd}$ codeword. $n_{DMRS}$ of each cluster can be predetermined or can be signaled by a higher layer.

Figure 29:
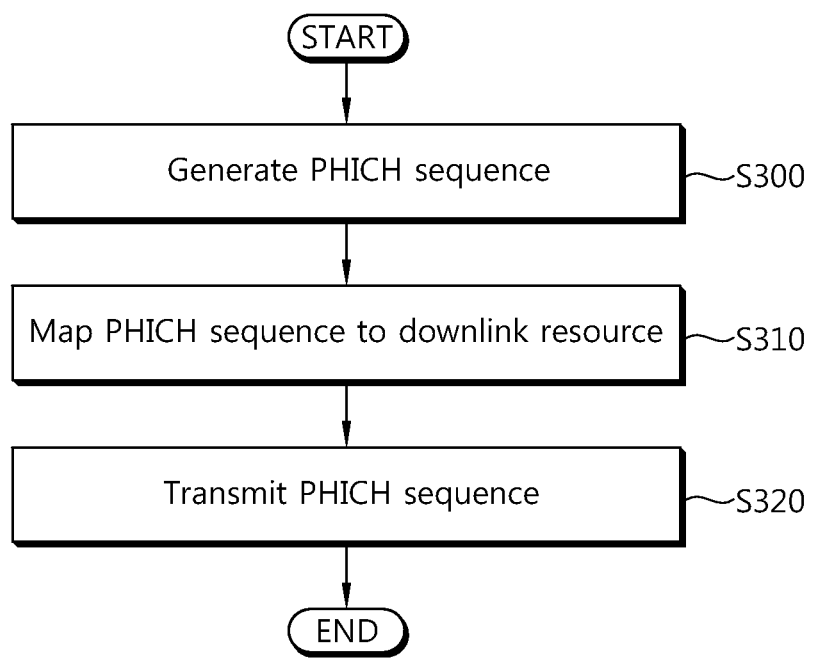
FIG. 29 shows an embodiment of the proposed ACK/NACK signal transmission method.

FIG. 29 shows an embodiment of the proposed ACK/NACK signal transmission method.

In step S300, a BS generates a plurality of PHICH sequences. In step S310, the BS maps the generated plurality of PHICH sequences to a downlink resource. In this case, resources to which a plurality of PHICHs are mapped may not overlap with each other. In step S320, the BS transmits the mapped plurality of PHICH sequences to a UE.

Figure 30:
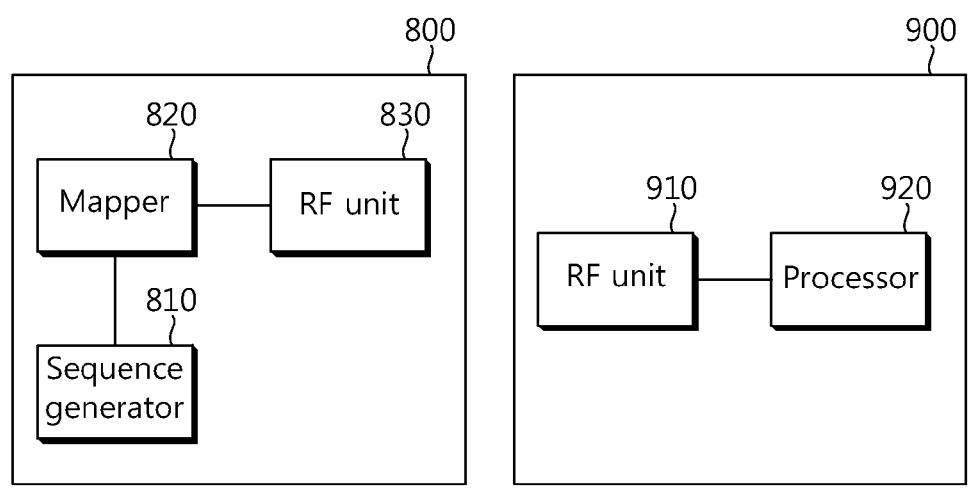
FIG. 30 is a block diagram showing a BS and a UE according to an embodiment of the present invention.

FIG. 30 is a block diagram showing a BS and a UE according to an embodiment of the present invention.

A BS 800 includes a sequence generator 810, a mapper 820, and a radio frequency (RF) unit 830. The sequence generator 810 generates a plurality of PHICH sequences. The mapper 820 maps the generated plurality of PHICH sequences to a downlink resource. In this case, resources to which a plurality of PHICHs may not overlap with each other. The RF unit 830 is coupled to the mapper 820, and transmits the mapped plurality of PHICH sequences to a UE.

A UE 900 includes a processor 910 and an RF unit 920. The RF unit 920 is coupled to the processor 910, and is configured to transmit a plurality of codewords through a PUSCH and to receive a plurality of ACK/NACK signals indicating whether the plurality of codewords are received through respective PHICHs corresponding to the respective codewords. The processor 910 processes the plurality of codewords and the plurality of ACK/NACK signals. Downlink resources to which the respective PHICHs are mapped are determined based on a lowest PRB index $I_{PRB\_RA}^{lowest\_index}$ to which the PUSCH is mapped and a parameter $n_{DMRS}$ regarding a DMRS transmitted using an uplink grant, and the downlink resources to which the respective PHICHs are mapped do not overlap with each other.

The exemplary embodiments of the present invention may be implemented by hardware, software, or a combination thereof. The hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof, all of which are designed so as to perform the above-mentioned functions. The software may be implemented by a module performing the above-mentioned functions. The software may be stored in a memory unit and may be executed by a processor. The memory unit or a processor may adopt various units well-known to those skilled in the art.

In the above-mentioned exemplary embodiments, the methods are described based on the series of steps or the flow charts shown by a block, but the exemplary embodiments of the present invention are not limited to the order of the steps and any steps may be performed in order different from the above-mentioned steps or simultaneously. In addition, a person skilled in the art to which the present invention pertains may understand that steps shown in the flow chart are not exclusive and thus, may include other steps or one or more step of the flow chart may be deleted without affecting the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belonging to the following claims.

What is claimed is:

1. A method for determining, by a user equipment (UE), a physical hybrid automatic repeat request (HARQ) indicator channel (PHICH) resource in a wireless communication system, the method comprising:
  determining, by the UE, a first PHICH resource and a second PHICH resource respectively corresponding to a first codeword and a second codeword,
  wherein the first PHICH resource is determined based on a lowest physical resource block (PRB) index $I_{PRB\_RA}^{lowest\_index}$ among PRBs in a first slot to which a physical uplink shared channel (PUSCH) is mapped, according equation below:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2 N_{SF}^{PHICH},$$

and
  wherein the second PHICH resource is determined based on the lowest PRB index $I_{PRB\_RA}^{lowest\_index}$, and an offset β according to equation below:

$$n_{PHICH}^{group} = ((I_{PRB\_RA}^{lowest\_index} + \beta) + n_{DMRS}) \bmod N_{PHICH}^{group} + I_{PHICH} N_{PHICH}^{group}$$

$$n_{PHICH}^{seq} = (\lfloor (I_{PRB\_RA}^{lowest\_index} + \beta) / N_{PHICH}^{group} \rfloor + n_{DMRS}) \bmod 2 N_{SF}^{PHICH},$$

where $n_{PHICH}^{group}$ is an index of a PHICH group, $n_{PHICH}^{seq}$ is an orthogonal sequence index in the PHICH group, $I_{PRB\_RA}^{lowest\_index}$ is the lowest PRB index among PRBs in a first slot to which the PUSCH is mapped, β is the offset, $n_{DMRS}$ is a cyclic shift field for a demodulation reference signal (DMRS), $N_{PHICH}^{group}$ is the number of PHICH groups, $I_{PHICH}$ is a value 0 or 1, and $N_{SF}^{PHICH}$ is a size of a spreading factor (SF).

2. The method of claim 1, wherein the offset β is 1.

3. The method of claim 1, further comprising transmitting the first codeword and the second codeword through the PUSCH.

4. The method of claim 3, wherein the first PHICH resource corresponds to a first transport block (TB) of the PUSCH, and wherein the second PHICH resource corresponds to a second TB of the PUSCH.

5. The method of claim 4, wherein the first TB corresponds to one of the first codeword or the second codeword, and
  wherein the second TB corresponds to the remaining codeword between the first codeword and the second codeword.

6. The method of claim 1, further comprising:
  receiving a first acknowledgement/non-acknowledgement (ACK/NACK) signal corresponding to a first codeword through the first PHICH resource; and
  receiving a second ACK/NACK signal corresponding to the second codeword through a second PHICH resource.

7. A user equipment (UE) in a wireless communication system, the UE comprising:
  a memory;
  a radio frequency (RF) unit; and
  a processor coupled to the memory and the RF unit, and configured to:
  determine a first PHICH resource and a second PHICH resource respectively corresponding to a first codeword and a second codeword,
  wherein the first PHICH resource is determined based on a lowest physical resource block (PRB) index $I_{PRB\_RA}^{lowest\_index}$ among PRBs in a first slot to which a physical uplink shared channel (PUSCH) is mapped, according equation below:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2 N_{SF}^{PHICH},$$

and
  wherein the second PHICH resource is determined based on the lowest PRB index $I_{PRB\_RA}^{lowest\_index}$, and an offset β according to equation below:

$$n_{PHICH}^{group} = \left(\left(I_{PRB\_RA}^{lowest\_index} + \beta\right) + n_{DMRS}\right) \bmod N_{PHICH}^{group} + I_{PHICH} N_{PHICH}^{group}$$

$$n_{PHICH}^{seq} = \left(\left\lfloor\left(I_{PRB\_RA}^{lowest\_index} + \beta\right)/N_{PHICH}^{group}\right\rfloor + n_{DMRS}\right) \bmod 2N_{SF}^{PHICH},$$

where $n_{PHICH}^{group}$ is an index of a PHICH group, $n_{PHICH}^{seq}$ is an orthogonal sequence index in the PHICH group, $I_{PRB\_RA}^{lowest\_index}$ is the lowest PRB index among PRBs in a first slot to which the PUSCH is mapped, $\beta$ is the offset, $n_{DMRS}$ is a cyclic shift field for a demodulation reference signal (DMRS), $N_{PHICH}^{group}$ is the number of PHICH groups, $I_{PHICH}$ is a value 0 or 1, and $N_{SF}^{PHICH}$ is a size of a spreading factor (SF).

8. The UE of claim 7, wherein the offset $\beta$ is 1.

9. The UE of claim 7, wherein the processor is further configured to transmit the first codeword and the second codeword through the PUSCH.

10. The UE of claim 9, wherein the first PHICH resource corresponds to a first transport block (TB) of the PUSCH, and
wherein the second PHICH resource corresponds to a second TB of the PUSCH.

11. The UE of claim 10, wherein the first TB corresponds to one of the first codeword or the second codeword, and
wherein the second TB corresponds to the remaining codeword between the first codeword and the second codeword.

12. The UE of claim 7, wherein the processor is further configured to:
receive a first acknowledgement/non-acknowledgement (ACK/NACK) signal corresponding to a first codeword through the first PHICH resource; and
receive a second ACK/NACK signal corresponding to the second codeword through a second PHICH resource.

* * * * *